Figure 1B:
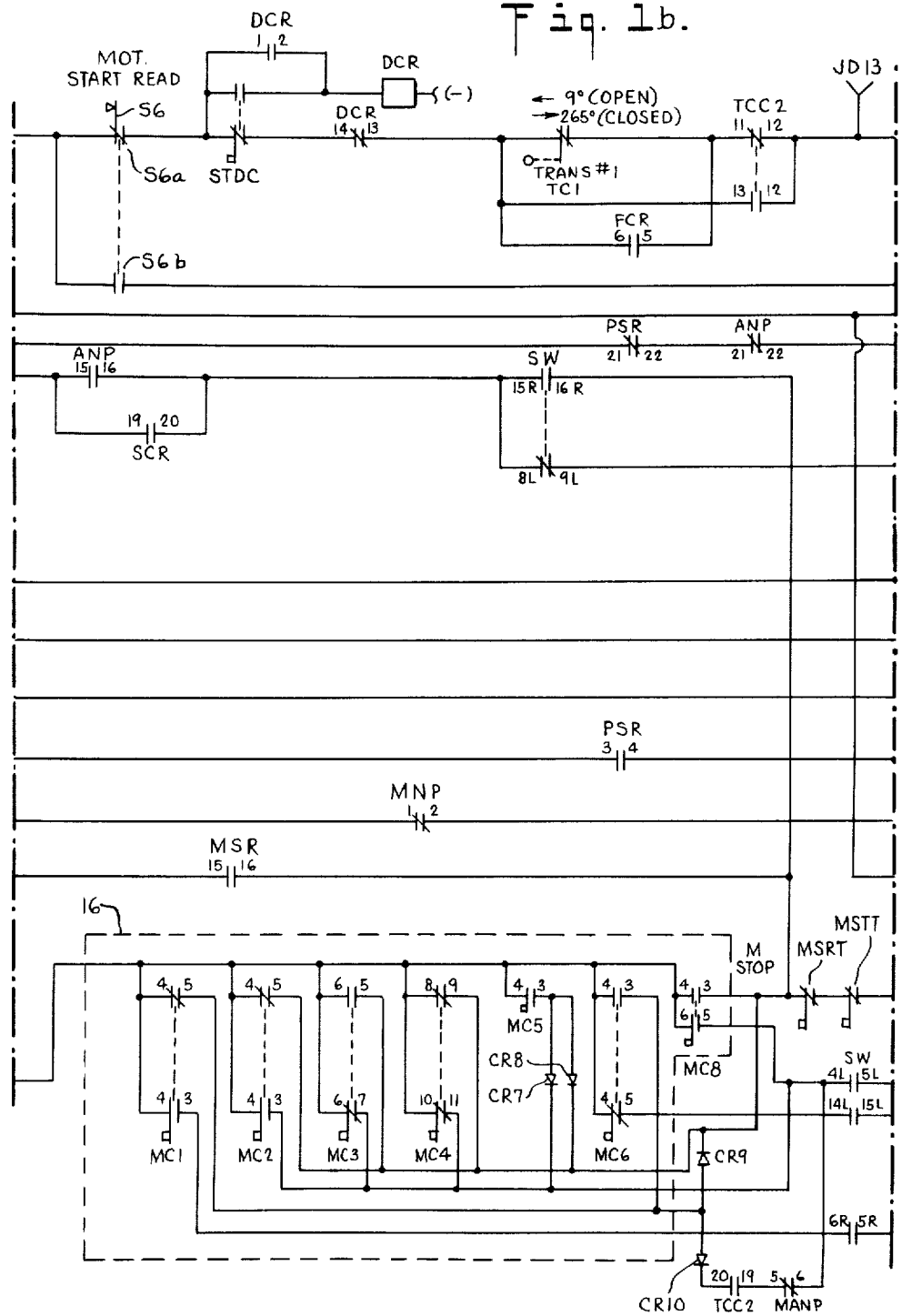
Figure 1C:
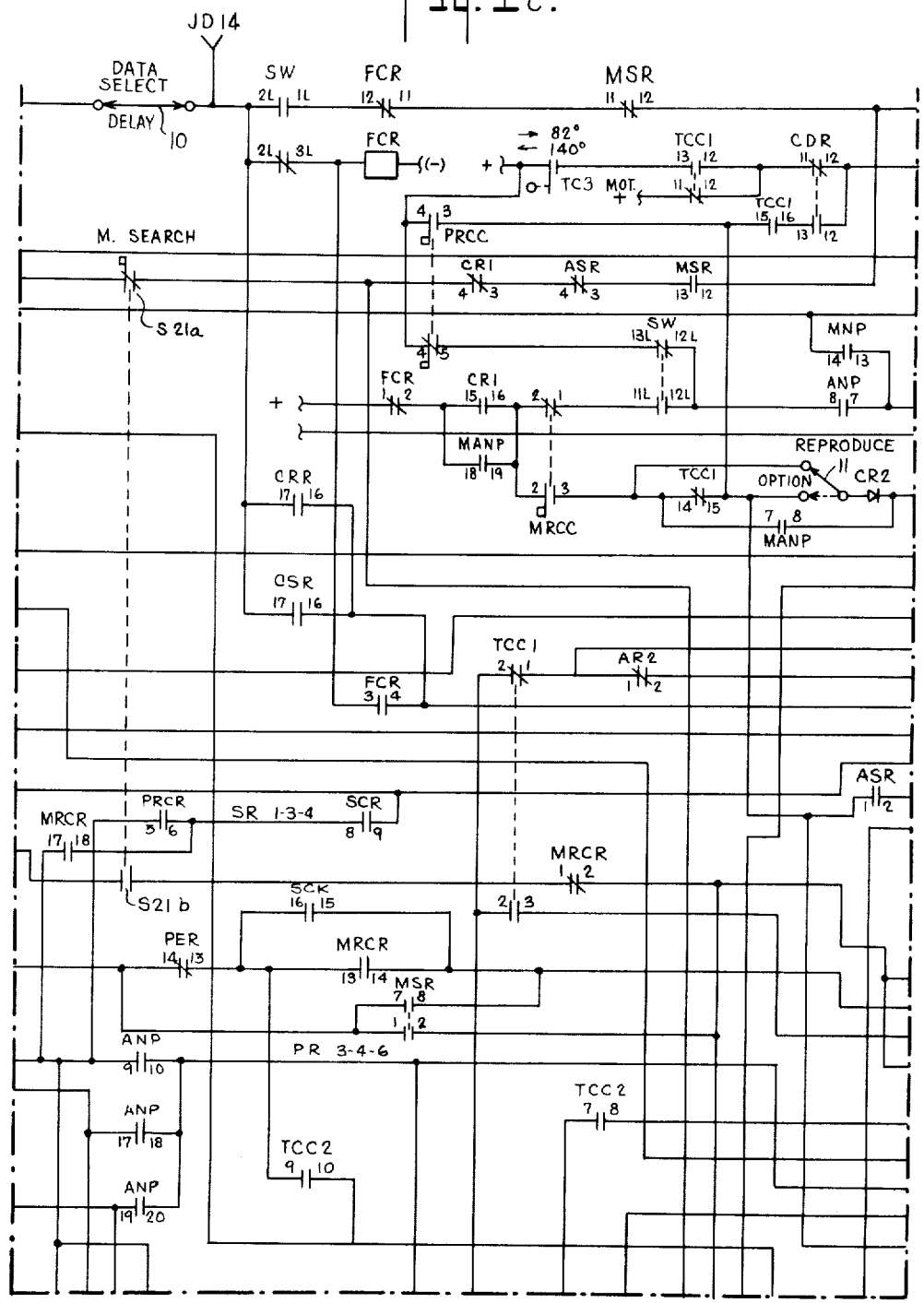
Figure 1D:
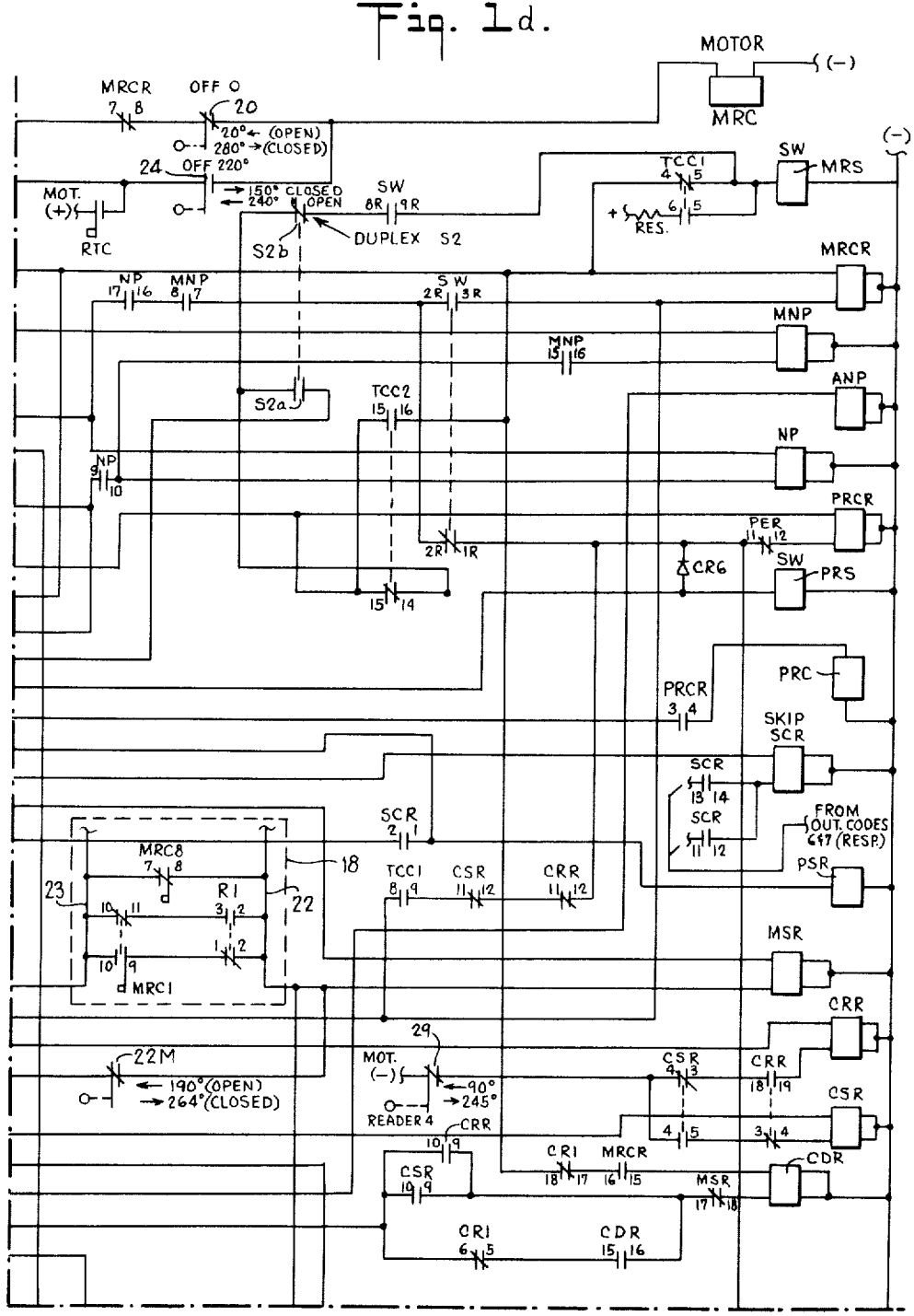
Figure 1F:
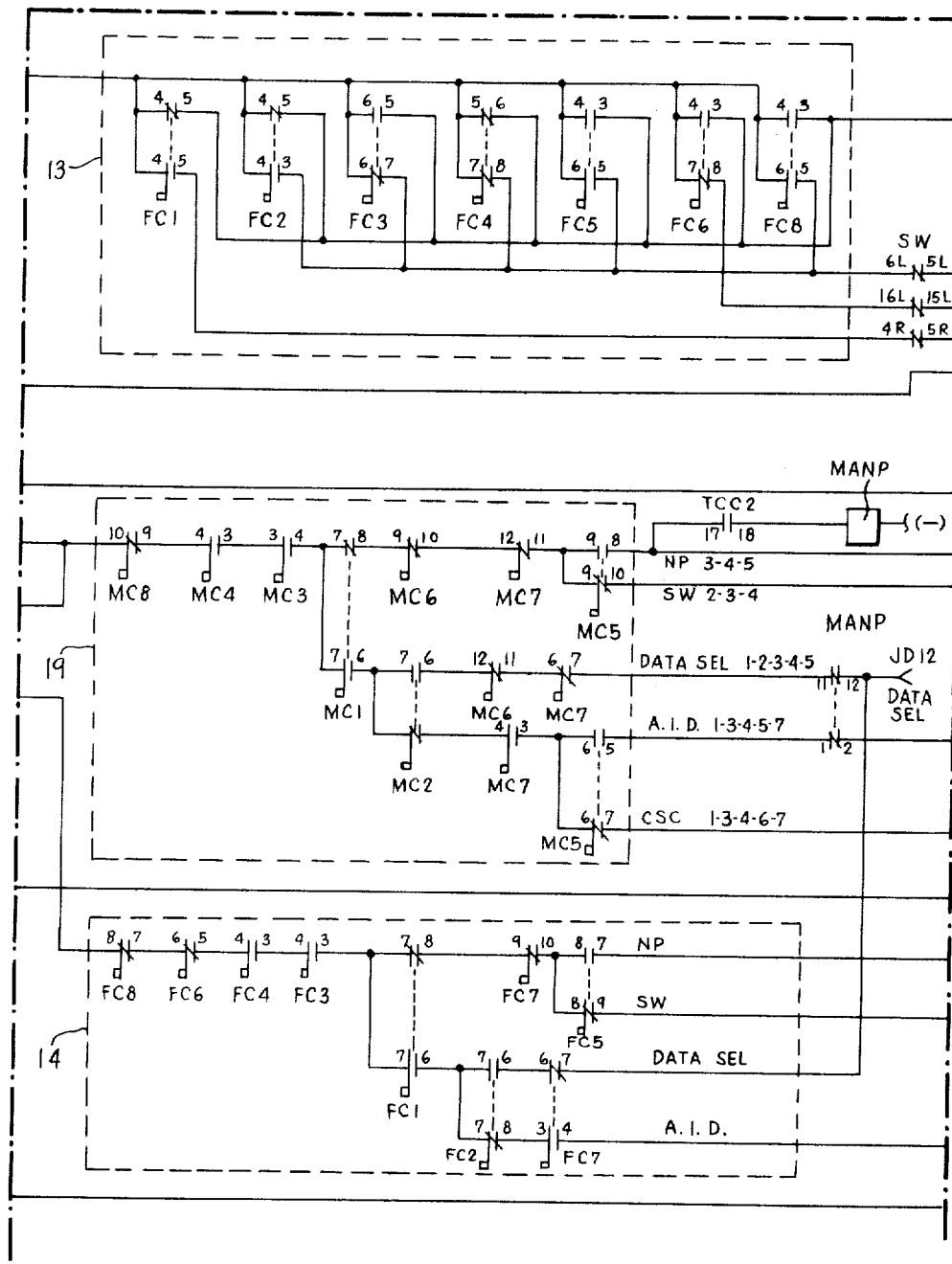
Figure 19:
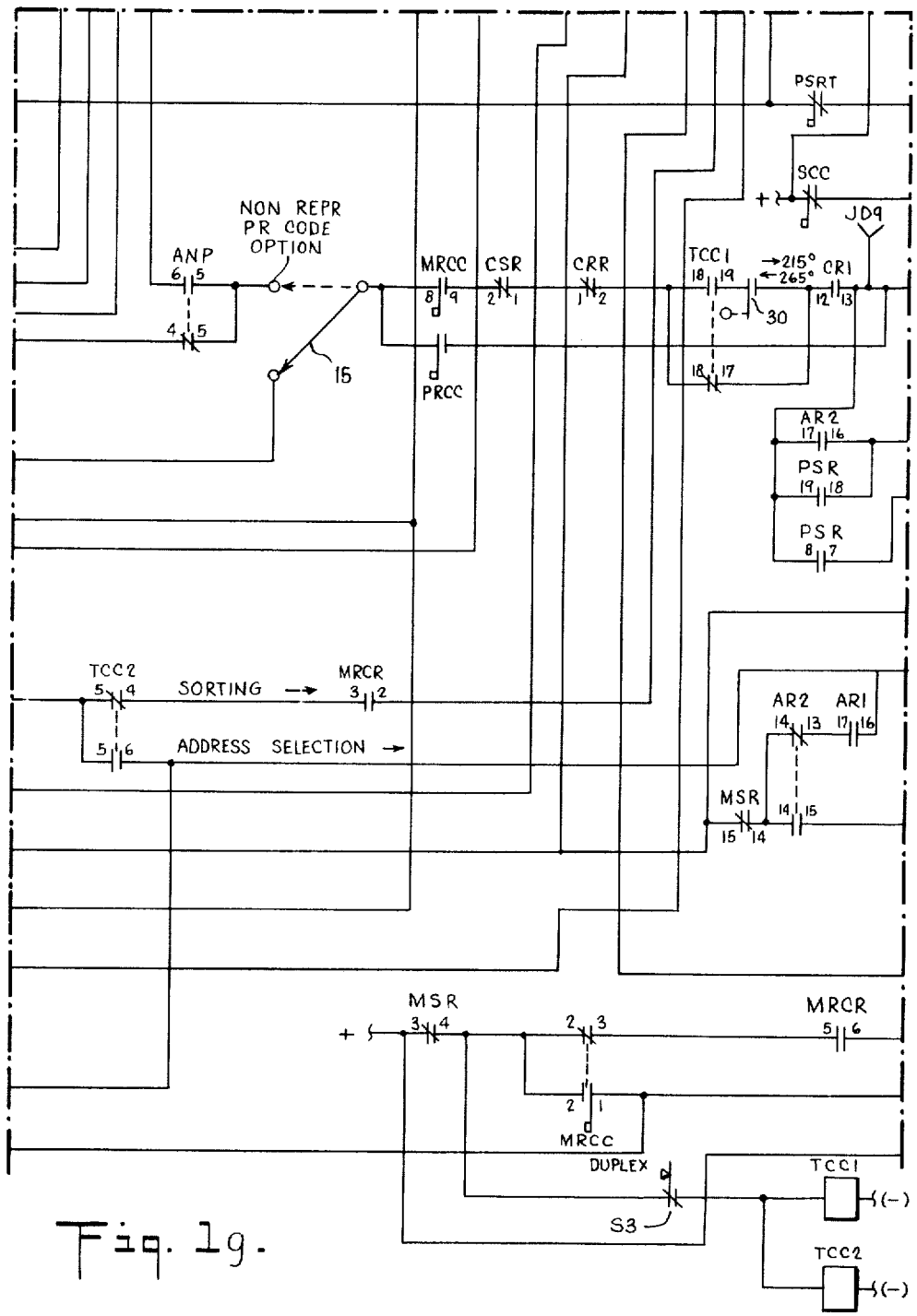

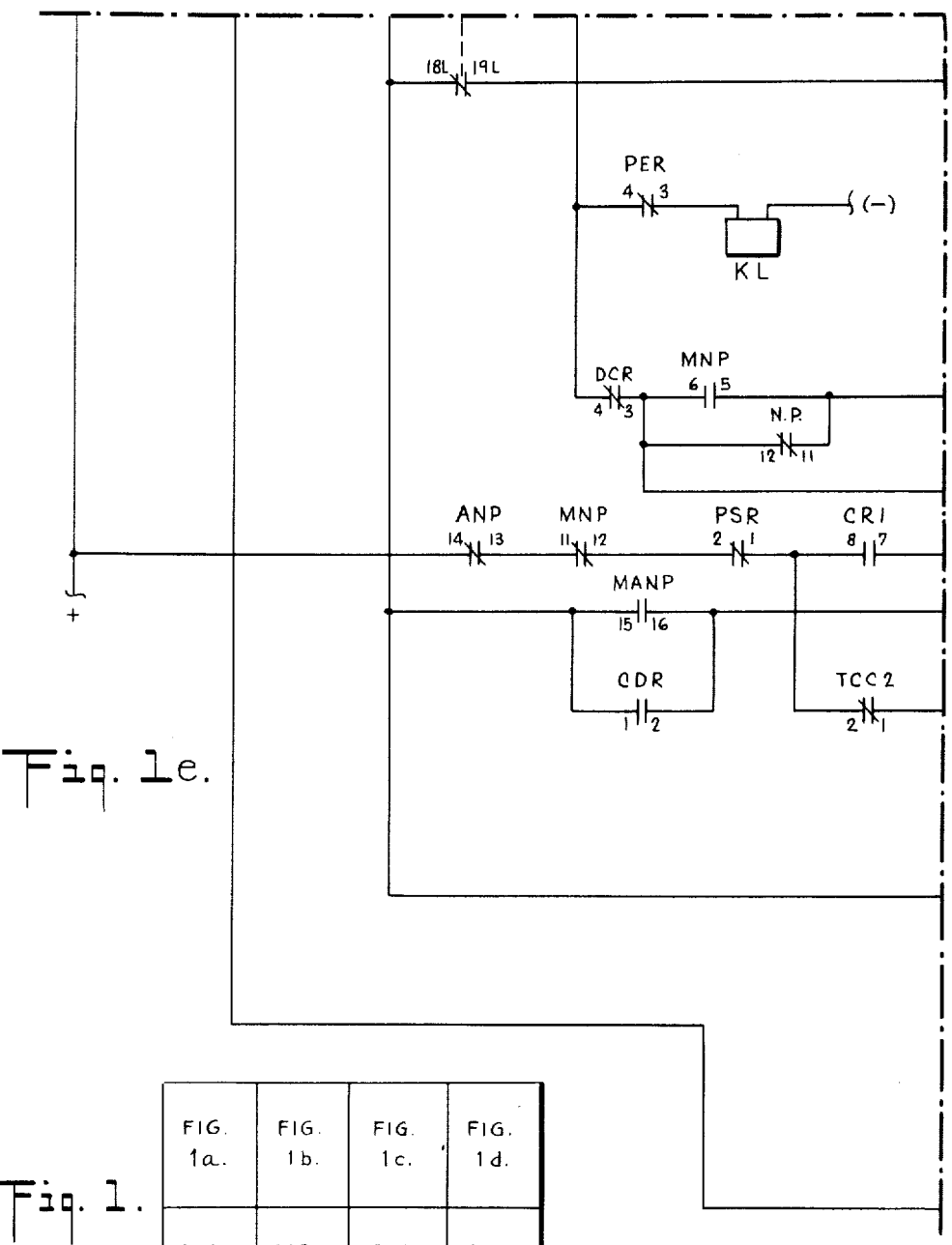

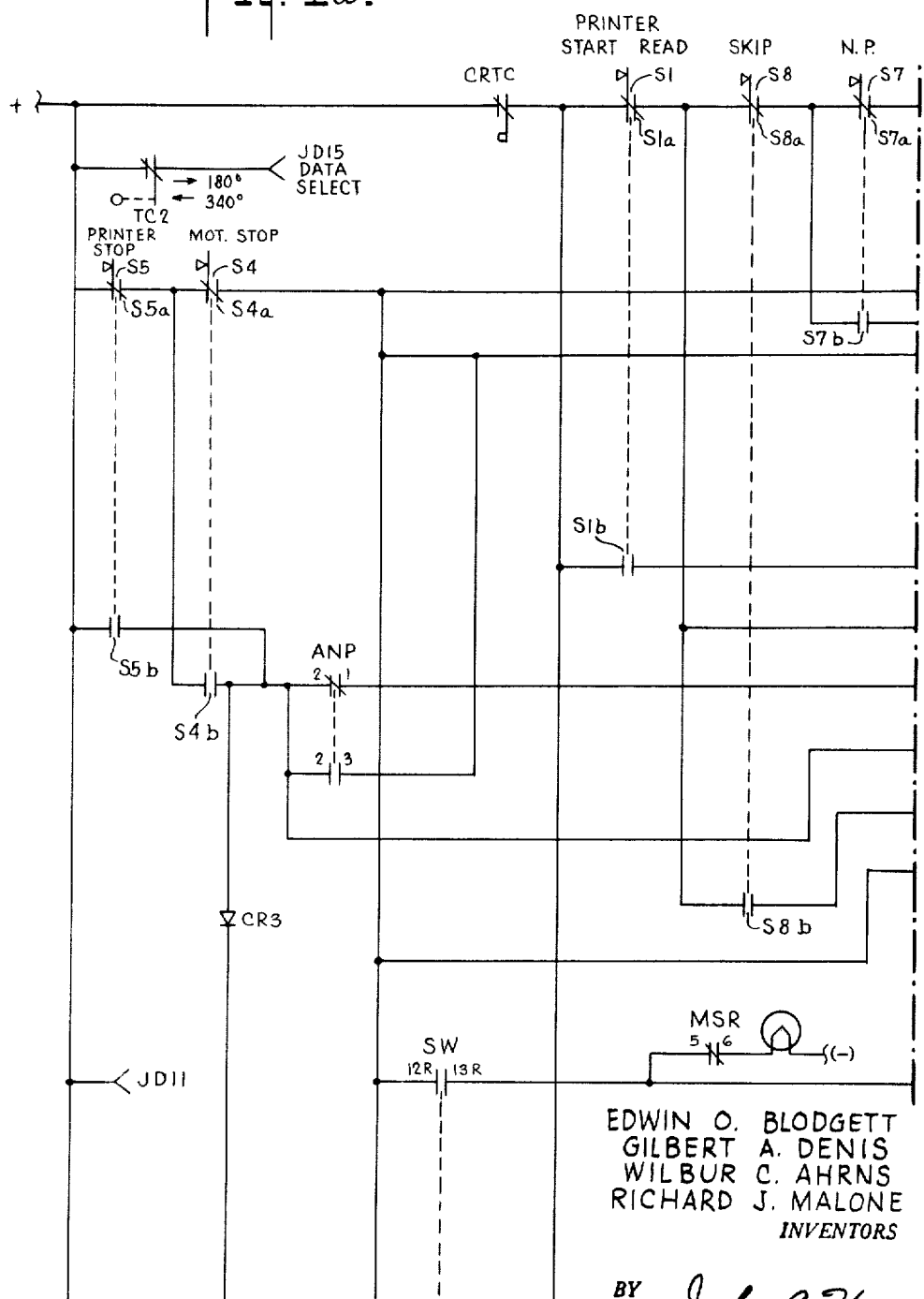

3,235,843
Patented Feb. 15, 1966

3,235,843
DATA TRANSLATION SYSTEM
Edwin O. Blodgett, Gilbert A. Dennis, and Wilbur C. Ahrns, Rochester, and Richard J. Malone, Penfield, N.Y., assignors by mesne assignments, to Friden, Inc., San Leandro, Calif., a corporation of Delaware
Filed Oct. 12, 1959, Ser. No. 845,989
27 Claims. (Cl. 340—172.5)

The present invention relates to data translation systems and, particularly, to systems in which data to be processed may be selectively derived from a record medium and selectively supplied to data translation devices for utilization. While the invention has wide utility, it has particular utility in connection with data printers utilizing punched-tape or punched tabulating card record media and will be described in that connection.

Punched-tape and punched tabulating cards have been widely accepted in integrated data processing systems for automatic operation of document and data originating machines. A tape-controlled printing machine of this nature is the subject of U.S. Patent No. 2,700,446, granted January 25, 1955, to E. O. Blodgett, and an improved tape or edge-punched tabulating card controlled printing machine is disclosed in the Edwin O. Blodgett et al. U.S. Patent No. 2,905,298 granted September 22, 1959. The printing machine disclosed in the patent last mentioned utilizes automatic program control to facilitate, with minimized manual keyboarding, the preparation at high speed and with extreme accuracy of documents and accompanying by-product punched-tape record media for use in further integrated data processing.

Automatically operated printers of the type mentioned permit much repetitive or invariable data to be automatically reproduced in the preparation of successive documents of like or similar format while at the same time enabling manual printing operations for the insertion of variable data required in the preparation of each individual document. It has heretofore been proposed that invariable data be supplied from one record medium and a limited amount of selectable variable data, such as names and addresses, be supplied item-by-item in succession from a second record medium in the preparation of such documents as form letters and the like. It is often desirable in preparing businesss forms and documents, and even in such simple applications as form letter preparation, that a wide range of variable data be supplied as and when required. It would be preferable in these instances to use automatically controlled program selection of such variable data to enable a high degree of flexibility in document preparation, and it would further be preferable that the selection be made as desired either with respect successively recorded variable data or without regard to the order of recording of successive data items in the second record medium.

A data processing system capable of accomplishing the desirable results last mentioned would have widespread utility in a large variety of business applications. For example, a record tape which enabled the preparation of a form letter relating to solicitation of orders for specified products would then be available for invoicing the products sold as a result of the solicitation since much of the variable data required in preparing the invoice forms is found in the record tape. In particular, there would be recorded with the name of the addressee his functional category and category sub-division in the merchandising field, the offered quantities and prices, and the terms and conditions of sale of the solicitation as applicable to him. Thus it would be desirable that all of this information be again used by automatic information selection to accomplish, in conjunction with a further record of individual orders received and shipments made, acknowledgements of orders and the invoicing of goods sold.

It would further be desirable for inventory control purposes that a by-product tape be produced during preparation of order acknowledgments or preparation of invoices, or both, in order that the by-product tape may later be used to make a record by individual product of the total number of each item ordered and the total number of each item shipped. For sales and management purposes, it would be desirable that this by-product tape be available for use in summarizing the total dollar sales for each item invoiced during selected periods, and that invoice totals be selectable at will from the by-product tape for purposes of recording total sales within a given period of time. These and many other applications involving the use of recorded data often demand a high degree of flexibility and extreme reliability in the manner with which recorded data may be selected for use, and yet require that the data selection be accompilshed rapidly and not involve such complex machine controls and procedure as to require a highly trained and skilled operator.

It is an object of the present invention to provide a new and improved data translation system capable of accomplishing the desirable results heretofore enumerated.

It is a further object of the invention to provide a novel data translation system wherein plural data storage record media may be utilized to supply under program control and selectively to data translating devices for utilization the data stored by successive data recordings in either medium or the data random stored in one record medium, the selection of the record medium to be used for this purpose at any time being effected either under manual control or in response to prerecorded program control stored in interspersed relation with the data information of one or both record media.

It is an additional object of the invention to provide a unique data translation system having a high degree of operational flexibility whereby either of two record media storing plural categories, of data may, under program controlled selection of one medium, supply data from either medium for use. This may include if desired the supply of data successively recorded in one medium or a search at high reading rate to locate a particular category of data recorded at random in one medium, and with the selection of category made either manually or by means of other recorded selection control as desired. Any data selected from successive data recordings or any data of the selected category when located after search in the one record medium is then read at a lower reading rate commensurate with the speed of operation of a data printer and data recorder, which may be manually or program controlled selectively either to print the data or re-record it in whole or in part or both to print and record the data in whole or in part.

It is yet a further object of the invention to provide a data translation system wherein a record medium storing program control instructions also stores plural categories of data with category identifying addresses, and may be searched at high reading rate to locate and supply to data utilization devices at much lower reading rate information having an address supplied under command of the one record medium from another record medium. In accomplishing this search, all other recorded information of the one medium is skipped over during the search. All or a portion only of the search address may be supplied from such other record medium, with the balance of the address being supplied either manually or automatically from the one record medium as desired, and is subject to being readily changed by manual or program control at any time.

It is a further object of the invention to provide a data translation system wherein plural data storing media readers are so inter-controlled that, under program command of one reader, data information and functional control instructions may be read and supplied by either reader for use by a data printer or a data recorder or both. The data so read from either medium may be that consecutively recorded therein or certain recorded data may be selectively skipped over without read out to the printer or recorder, the skip-read operation being subject to manual control or programmed control by the one reader as desired for a particular skip operation, and may under selective manual or program control be either printed or recorded in whole or in part or both printed and recorded in whole or in part.

Other objects and advantages of the invention will appear as the detailed description thereof proceeds in the light of the drawings forming a part of this application and in which FIGS. 1a–1h, arranged as indicated in FIG. 1, represent the components employed in and the electrical control system of a data translation system embodying the invention.

GENERAL ORGANIZATION AND OPERATION

The data translation system herein described utilizes a punched-tape or punched tabulating card controlled printer and punched-tape recorder of the type shown in the aforementioned Blodgett et al. patent to which reference is made for an understanding of the general mechanical construction and operation of the printer and its associated punched-tape or card reader and by-product tape punch. The punched-tape or punched tabulating card reader shown as used with the printer in Patent No. 2,905,298 may, if desired, be replaced by a similar punched tabulating card reader having the construction disclosed in the Edwin O. Blodgett application Serial No. 845,782, filed October 12, 1959, entitled Tabulating Card Reader, and assigned to the same assignee as the present application. As explained in the patent last mentioned, data and functional control information is recorded by combinational arrangements of code bits positioned in successive groups each identifying an alpha-numeric character, a symbol, or a function to be performed. Tabulating cards conventionally employ a twelve bit code widely referred to as the Hollerith code, while the punched-tape employed in a punched-tape reader of the present system uses a maxmum of eight code bits and thus is said to convey eight channels of information. The punched tabulating card reader and punched-tape reader have card or tape feed arrangements for moving the card or tape code-bit group by code-bit-group through the reader, and each code group is read by aligned reading pins of which there is one pin for each code level used. Those reading pins which project through apertures of the card or tape during a reading operation complete electrical circuits which may be used either to actuate a code translator structure in the printer, and thereby effect power driven key lever and functional control actuations of the printer, or to energize punch magnets of a punch structure to effect repunching of the information into a by-product tape. Key lever and functional control operations of the printer also energize coded combinations of electrical output circuits which may control the punch to record in the by-product tape selected portions or all of the information necessary to duplicate the printed copy and its format.

The system as herein described has two important modes of system operation. These are designated the non-synchronous mode, characterized by extreme flexibility of information supply by either the motorized or printer readers under program control of either reader, and the synchronous mode characterized by program control by the motor reader over the printer reader which is in this instance will ordinarily be of the tabulating card type using the Hollerith code but may be of the punched-tape type such as shown in either of the aforementioned patents.

The data translation system herein described includes, as just mentioned, a punched-tape reader which may be included in a self-motorized unit cable connected to the printer structure and having the general construction of that disclosed in the United States Patent No. 2,927,158 to E. O. Blodgett et al.

The arrangement herein described may also include, constructed integrally with the printer or reader last mentioned or even as a separate auxiliary unit, a manual data selector by which numeric information up to a maximum of ten digits and one or more symbols may be manually selected for programmed use. This manual data selector includes ten switches which may each be manually set to any numeric value from zero through nine and which when so set generate, upon data read out, coded numeric data which controls the printer numeric and symbol keylevers in the same manner as coded numeric data and symbols read from a punched tape or a tabulating card. Read out of the manual data selector is accomplished by energizing a stepping switch therein, which operates through a stepping cycle successively to energize the ten manually settable switches and thereby supply to the printer in succession the ten numeric data digits or symbols to which the ten switches have been set. A manual data selector of this type is disclosed in the Edwin O. Blogett, United States Patent No. 3,025,941.

In the non-synchronous mode of system operation, either the motorized or printer reader has the ability under manual control to skip over recorded information until the skipping is terminated under program control or manually. The system also has the ability to effect non-printing of information read from either reader. This latter operation is subject to initiation either manually or under program control; it is terminated manually or by reading a stop code if manually initiated, or otherwise may be manually halted (but not manually terminated) and is eventually terminated only by reading a programmed print restore code. The information read but not printed during a non-print operation may be recorded in a by-product tape so that any information read by either of the readers but not printed may be recorded in whole or in part in the by-product tape by selective control of the by-product tape punch.

For convenience of description, the punched-tape or tabulating card reader which forms a component of the printer as in the aforementioned Blodgett et al. patent will be hereinafter referred to as the printer reader whereas the second punched-tape reader will be referred to for convenience as the motorized reader. It will be understood that this designation is used simply for convenience of description, and does not imply that the second tape reader is necessarily a separate and distinct motorized unit as distinguished from a construction wherein it also is a component of the printer.

The punched-tape used in the system herein described utilizes an 8-level punch code which may be similar to that used in the aforementioned Blodgett et al. patent in so far as normal alpha-numeric characters, symbols, and functional control information is concerned. The eighth level of the code is particularly used, however, to identify any of the 127 different address or classification codes used at the beginning of each item or block of information which is to form the subject of an information search performed by the motorized reader during operation of the system. The address codes thus differ from normal information codes by always including a code bit in the 8th channel. For the non-synchronous mode of system operation, each item or block of information thus identified by an address may be terminated by an address identification code, a switch code, or a stop code depending upon the operational programming desired. The functions of the several codes last mentioned will shortly be explained. The punched tape used with the data translation system herein described, and having data addresses identified by an 8-level code bit, can be prepared as a by-product tape of the printer either by manual key lever operation or by suitable programmed control of the printer by a program tape read by the printer reader. The motorized reader includes seven manual switches which can be operated in various combinations to select any one of the 127 different address codes available, or any one of these addresses may be specified by an address code recorded in the tape or card of the printer reader. The address of information for which a search is to be made in the motorized reader tape thus can be supplied either by the manual setting of these seven switches, or by an address supplied from the tape or card of the printer reader, or supplied in part by the latter with the balance of the address being supplied by the motorized reader.

Whenever an address identified information item or block of information is desired from the punched tape of the motorized reader, the operation of the latter is controlled to initiate a search at a high reading rate until the information is found. This search may be initiated manually, in which event the identifying address is normally established by manual operation of the seven address selection switches earlier mentioned, or may be initiated automatically under control of a search command read by the printer reader in the non-synchronous mode of system operation or read by the motorized reader in the synchronous mode. If the search is initiated by the printer reader, an address identification code (referred to herein as an AID code) is first read and this is followed by the address of the information sought; the address thus provided by the printer reader is stored in the motorized reader which immediately begins the search and continues it until the addressed information is located. While this search is in progress, the printer reader continues normal operation until it reads a switch code which thereupon halts the printer reader and transfers control of all subsequent operations to the motorized reader. If the latter has located the addressed information and has halted awaiting the switch code, it responds to the latter and proceeds to read the addressed information to the printer for reproduction or to a tape punch for recording of the information should the operation at that time be of the non-print character. If the addressed information has not been located at the time the switch code is read by the printer reader, the latter nevertheless halts its operation and the motorized reader continues its search and immediately reads the addressed information as soon as it is located. If the printer reader is of the tabulating card type using the Hollerith code, the synchronous mode of system operation is ordinarily used and a search is again initiated by the printer reader but in this case under control of the motorized reader. The motorized reader in this instance immediately calls for a search address from the card reader, and read-out from both readers halts until the search is completed at high reading rate by the motorized reader after which the information located by the search is read out to the printer or tape punch at lower reading rate.

For the non-synchronous mode of operation, information read out after search location may be terminated by a further search command and in this event the motorized reader immediately initiates a new search for information having the same address as that last sought and reads the addressed information out as soon as it is located. If the addressed information in the non-synchronous operational mode is terminated by a stop code, the motorized reader operation halts to permit a further manual operation. This may include a new address selection effected by manual setting of the seven addresses switches earlier mentioned, or may include one or more manual printing or other desired manual operations. Resumed operation by use of either reader is then available and is effected manually. If the addressed information read-out by the motorized reader is terminated by a switch code in the non-synchronous operational mode, this code causes immediate halt of operation of the motorized reader and initiates further operation of the printer reader.

This alternate transfer of reader operation between the printer reader and the motorized reader during the non-synchronous operational mode is hereinafter referred to for convenience as duplex operation, and is effected only upon manual setting of a duplex switch provided for this purpose. Where in the non-synchronous operational mode the record medium read by the printer reader does not itself record address identity information but merely utilizes a switch code, it is possible manually to select an address by means of the seven address selection switches and thereafter manually to actuate the motorized reader search switch to effect a single search operation all of which may be accomplished while the printer reader is continuing through a period of its operation. Now the subsequent reading of a switch code by the printer reader simply effects read-out by the motorized reader of the information located by this manual operational procedure.

If the duplex switch previously mentioned is not manually actuated to its duplex position, the system operation is of the synchronous type and the operations of each reader are generally as described except that a switch code read during operation of the motorized reader causes one item of information to be read by the printer reader and a skip code read by the motorized reader causes one item of information to be read by the printer reader but not utilized. This type of operation is particularly useful where the printer reader is of the type for reading a tabulating card using the Hollerith code, and enables the tabulating card to be read column-by-column under program control of the motorized reader.

The motorized reader performs its searching operation at a much higher reading rate than is permissible when information is to be read out to the printer or by-product tape punch. Upon completion of each search and the initiation of an information readout operation, the reading rate of the motorized tape reader is automatically reduced to the highest rate at which the information can be utilized by the printer or by-product tape punch. This control of the motorized reader reading rate thus minimizes the required search time while permitting the system operation at the maximum rate at which the printer or by-product tape punch can receive and utilize the information without operational error.

The electrical circuit arrangement of the data translation system of the present invention is shown in FIGS. 1a–1g, which should be considered together arranged as shown in FIG. 1.

*(1) Duplex (non-synchronous) operation under control of the printer reader*

The system includes a manually actuable printer reader start read switch S1 which, upon actuation, opens a pair of contacts S1a and closes a pair of contacts S1b to energize a reader control relay PRCR through a circuit which includes the normally closed contacts CRTC of the printer. The latter contacts are opened and remain open during each carriage return or tabulation operation of the printer. A switch unlatch magnet PRS of a switch relay SW is energized concurrently with the relay PRCR through normally closed contacts 1 and 2 of a relay AR2 and through the normally open contacts S2a of a duplex switch S2 which is manually operated, to close its contacts S2a, prior to or concurrently with the read switch S1. The switch S2 when manually released opens its contacts S2a and closes its contacts S2b. A second duplex switch S3 is manually operated concurrently with the duplex switch S2, the contacts of the switch S3 thereupon being opened and remaining open until some later time when the switch S3 is again manually actuated to close its contacts for the purpose of terminating the duplex mode of operation and selecting instead the synchronized mode of operation hereinafter described. The unlatch magnet PRS operates in association with a magnet MRS of the switch relay SW. Upon energization of the magnet MRS, the switch relay SW moves its contacts to (and mechanically latches them in) one position enabling operation of the motorized reader. Subsequent energization of the unlatch magnet PRS serves to unlatch the contacts of the switch relay SW and position them to enable generalized selection of the printer reader for operation. FIG. 1 shows the switch relay contacts in the last mentioned (unlatched) position.

The relay PRCR having been thus energized is thereafter maintained energized through a hold circuit which includes the relay contacts 11 and 12 of a punch error relay PER, the relay contacts PRCR 1–2 now closed, the printer reader contacts PSRT which are closed when a tape or card is in the printer reader in readiness to be read, normally closed stop-code 1–2–4 reader contacts of the printer reader contact bank 13, the now closed contacts 18L and 19L of the switch relay SW, the normally closed contacts S4a of a motorized reader stop switch S4, and the normally closed contacts S5a of a printer reader stop switch S5.

When the start read switch S1 is manually released and returns by spring bias to the position in which its contacts S1a are closed and its contacts S1b open, a relay FCR is energized through a circuit which includes the now closed contacts 2L and 3L of the switch relay SW, a conductive link 10 connecting circuit terminals JD13 and JD14, normally closed contacts 11 and 12 of a relay TCC2, the cam-actuated contacts TC1 of the printer which are closed each time the printer completes a cycle of its operation, the normally closed contacts 13 and 14 of a delay control relay DCR provided in the printer for purposes presently to be described, the normally closed contacts STDC provided in the printer and actuated by any of several keylevers affecting printer functions requiring a temporary halt in the printer reader operation, the normally closed contacts S6a of a motorized reader start read switch S6, the normally closed contacts S7a of a manual non-print switch S7, the normally closed contacts S8a of a manual skip switch S8, the normally closed contacts S1a of the start read switch S1, and the normally closed contacts CRTC earlier mentioned. The contacts 5 and 6 of the relay FCR now close to remove the printer cam-actuated contacts TC1 from the energizing circuit last traced.

The printer reader is now placed in operation by energization of its reader clutch magnet PRC through a circuit which includes the now closed contacts 3 and 4 of the relay PRCR, and the now closed contacts 3 and 4 of the relay FCR to the energizing circuit of the relay FCR last traced. The reader operation normally continues until its reader contact bank 13 reads a stop code 1-2-4 or either of the stop switches S4 or S5 is manually actuated, either of which interrupts the hold circuit earlier described of the reader control relay PRCR, thereupon deenergizing this relay and causing its contacts 3 and 4 to interrupt the energizing circuit of the reader clutch magnet PRC. Thus it will be seen that the printer reader once placed in operation will continue reading its tape until it reads a stop code 1-2-4 or a stop switch is manually actuated.

Figure 1H:
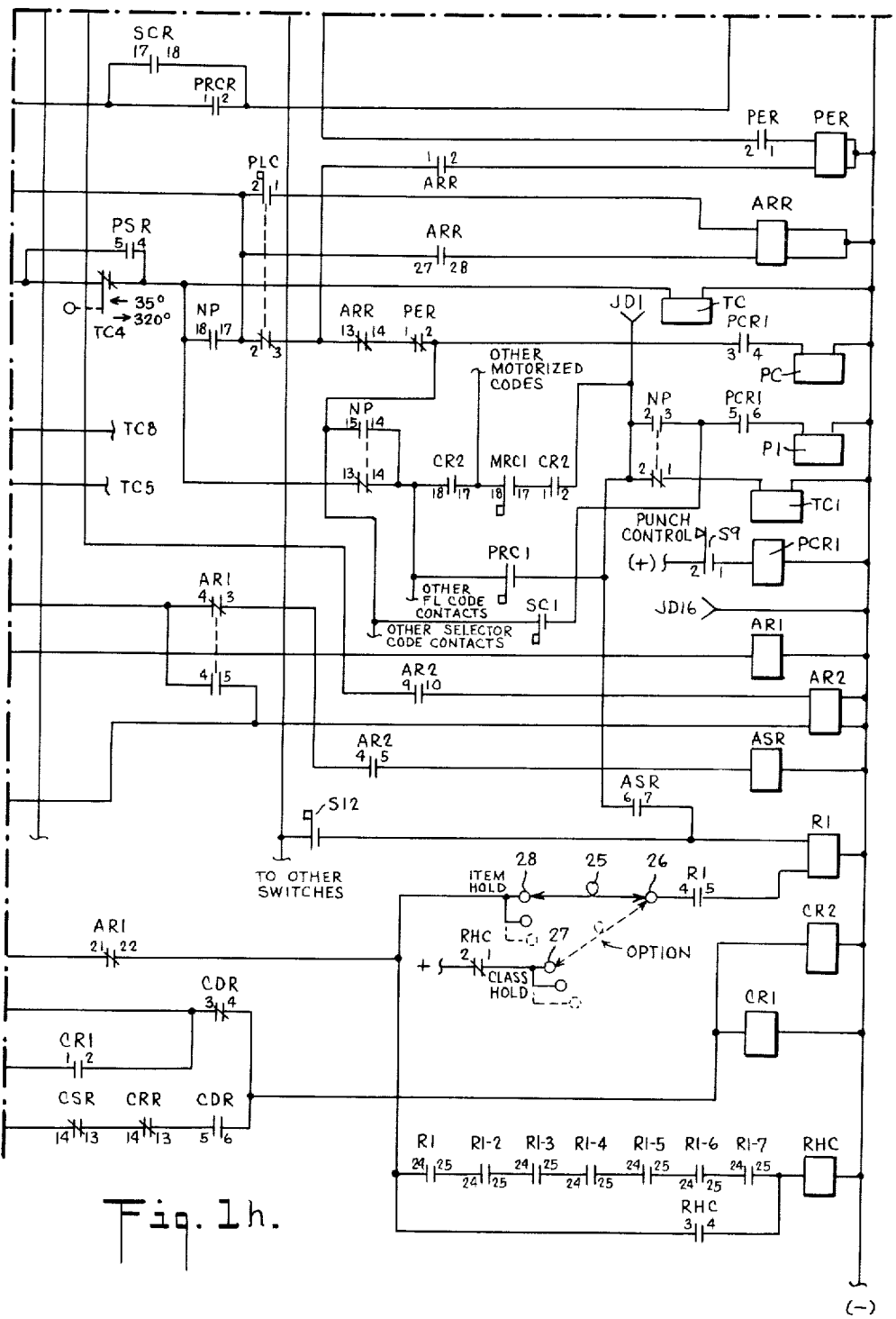

While the reader thus operates, it supplies the information read from its tape or card to the printer or to the by-product tape punch as explained more fully in the aforementioned Blodgett patents. In here briefly reviewing this operational phase of the system, only those components of the first-code-level are shown for simplicity. It will be understood, however, that similar components are provided for code levels 2 through 8 as more fully disclosed in the Blodgett et al. Patent No. 2,905,298. The printer reader includes plural code reading contacts of which for simplicity, as just noted, only the first level contacts PRC1 of the first level contact assembly (additional contacts of the first through eighth level contact assemblies are shown in the reader contact banks 13 and 14) are shown in FIG. 1h. When these close by reading a one level code bit, they energize a printer code translator magnet TC1 through a circuit which includes normally closed contacts 1 and 2 of a non-print relay NP, the normally closed contacts 12 and 13 of the non-print relay NP, the cam-actuated contacts TC4 which are closed at 320° of one printer cycle and open at 35° of the next printer cycle, normally open reader common contacts PRCC which close at approximately 80° of the reader cycle while the reader pins are in reading position, and a switch 15 which in one position completes the energizing circuit here considered through the normally closed contacts 3 and 4 of the delay control relay DCR to the normally closed carriage return contact CRTC or which in the other position of the switch 15 completes the energizing circuit through normally closed contacts 4 and 5 of an automatic non-print relay ANP and the normally closed contacts 11 and 12 of a non-print relay NP to the normally closed contacts 3 and 4 of the delay control relay DCR. The function of the switch 15 in completing the alternate energizing circuits last described will be explained hereinafter in connection with the automatic non-print operation. The translator clutch magnet TC is energized directly by the printer cam-actuated contacts TC4 of the energizing circuit last described, and this energization of the translator clutch and translator magnets (TC1 and other translator magnets, not shown, in accordance with the information code read) effects automatic keylever actuations of the printer in reproducing printed copy.

If it should be desired that a portion or all of the information printed be recorded in a by-product tape, a punch control relay PCR1 is energized by manual actuation of a punch control switch S9 (FIG. 1g) to close its contacts 1 and 2. The relay PCR1 when energized closes its contacts 3 and 4 by which to energize the punch clutch magnet PC through the normally closed contacts 1 and 2 of a punch error relay PER, the normally closed contacts 13 and 14 of an anti-repeat relay ARR, the normally closed contacts 2 and 3 of a punch latch contact PLC (which transfers its contacts 1–3 throughout the major portion of a punch cycle), and the code selector common contacts SCC which close during each printer cycle of operation. The relay PCR1 also closes its contacts 5 and 6 by which to energize a first-code-level punch magnet P1 (the higher level punch magnets and corresponding contacts of the relay PCR1 being omitted for simplicity as previously explained) through the printer code selector contacts SC1 (other such selector contacts being provided for the higher level punch magnets) actuated in conformity with the particular functional operation performed by the printer. The punch structure and its complete mode of operation are described in the aforementioned Blodgett et al. patent, and it may here merely be added in connection with the anti-repeat relay ARR that contacts 1 and 2 of a punch latch contact PLC and the code selector common contact SCC together energize the anti-repeat relay ARR in the event that the keylever actuations of the printer should occur at a rate (by manual keylever operation) higher than the cyclic periodicity of the punch. Should this occur, the contacts 27 and 28 of the relay ARR close to maintain the latter energized through the contacts SCC alone, and the contacts 1 and 2 of the relay ARR energize the punch error relay PER if the relay ARR is yet energized when the contacts 2 and 3 of the punch contact PLC again close. The relay PER if energized holds through its contacts 1 and 2 and the start read switch S1. The contacts 11 and 12 of the punch error relay PER interrupt the hold circuit of the printer read control relay PRCR to deenergize this relay and require that the printer reader be manually re-started by actuation of the start read switch S1 to interrupt the hold circuit of the relay PER and reenergize the reader control relay PRCR as described above. The normally closed contacts 3 and 4 of the punch error relay PER are opened by energization of the latter, and when so opened lock up the key levers of the printer against actuation by deenergization of a keylock magnet KL (FIG. 1e).

The printer herein described, as in the aforementioned Blodgett et al. patent, may be manually and program controlled to effect non-printing of information read from either the printer reader or the motorized reader. The information not so printed may, however, be recorded in a by-product tape by manual control of the by-product tape punch as last described. Manual non-print control is effected by manually actuating the non-print switch S7 to open its contacts S7a and close its contacts S7b. Opening of the contacts S7a interrupts the energizing circuit of the reader clutch magnet PRC to halt the operation of the printer reader, and closure of the non-print switch contacts S7b energizes a manual non-print relay MNP through a circuit which includes normally closed contacts 21 and 22 of an automatic non-print relay ANP and the normally closed contacts 21 and 22 of a skip relay SR. The manual non-print relay MNP closes its contacts 13 and 14 to pick up a non-print relay NP while the non-print switch S7 is still actuated to close its contacts S7b. The now closed contacts 16 and 17 of the relay NP and the now closed contacts 7 and 8 of the relay MNP energize either the read control relay PRCR through the contacts 1R and 2R of the switch relay SW or a motorized reader read control relay MRCR through the contacts 2R and 3R of the switch relay SW depending upon which reader was last operating. These relays remain energized through the now closed contacts 13 and 14 of the relay MNP, the new closed contacts 16 and 17 of the relay NP, the now closed contacts 7 and 8 of the relay MNP and either the contacts 1R and 2R of the switch relay SW to the hold circuit for the relay PRCR or the contacts 2R and 3R of the switch relay SW to the hold circuit of the motorized reader control relay MRCR depending upon whether the printer reader or motorized reader is reading at this time. An auxiliary hold circuit for the relays MNP and NP includes the contacts 15 and 16 of the relay MNP, the contacts 9 and 10 of the relay NP, a diode rectifier CR2, and an option switch 11 either directly or through normally closed contacts 14 and 15 of a relay TCC1 to the printer reader common contacts PRCC 3, 4, whereby these relays shall always remain energized until the end of a reader cycle.

While the non-print relay NP remains energized, its contacts 1 and 2 open and its contacts 2 and 3 close to remove the translator magnet TC1 from the reader contacts PRC1 and connect the latter to the punch magnet P1 if the punch control relay PCR1 is energized at this time to close its contacts 5 and 6 (other contacts not shown of the relay NP effect like transfer between the reader contacts and the translator and punch magnets as more fully disclosed in the aforementioned Blodgett et al. patent). At the same time, the energizing circuit of the reader contacts PRC1 is modified by transfer of the contacts 13, 14 and 14, 15 of the non-print relay NP so as to include contacts 1 and 2 of the punch error relay PER, contacts 13 and 14 of the anti-repeat relay ARR, the normally closed contacts 2 and 3 of the punch latch contact PLC, and the now closed contacts 17, 18 of the non-print relay NP so that the energization of the punch clutch magnet PC and reader contacts PRC1 are controlled each reader cycle by operation of the printer reader common contacts PRCC. The energizing circuit here considered is completed for one position of the switch 15 directly to the contacts 3 and 4 of the delay control relay DCR, and is completed in the other position of the switch 15 through the normally closed contacts 4 and 5 of the automatic non-print relay ANP and the now closed contacts 5 and 6 of the manual non-print relay MNP to the contacts 3 and 4 of the delay control relay RDC. Actually the alternate positioning of the switch 15 has relation only to the automatic non-print operation as will presently be explained.

Now as soon as the non-print switch S7 is manually released and again closes its contacts S7a, the energizing circuit of the reader clutch magnet PRC is reestablished and the printer reader resumes operation. As mentioned above, the reader will continue operation until such time as the reader contact bank 13 reads a 1-2-4 stop code or the printer stop switch S5 is manually actuated.

The automatic non-print operation is similar to that just described except that it is initiated when the printer reader reads an automatic non-print code 3-4-5. When this occurs, the reader contact bank 14 energizes an automatic non-print relay ANP and the contacts 9 and 10, 17 and 18, and 19 and 20 of the latter close to complete a hold circuit for this relay through the contacts 5L and 6L, 15L and 16L, and 4R and 5R of the switch relay SW and the normally closed print restore code 3-4-6 contacts of the printer reader contact bank 13. Note in this respect that the reader contact bank 14 is unable to energize the automatic non-print relay ANP as last mentioned during a manual non-print operation since the energizing circuit of these contacts is interrupted by the contacts 11 and 12 of the manual non-print relay MNP. The contacts 13 and 14 of the automatic non-print relay ANP deenergize the reader contact bank 14 to cause the reader to ignore several operational codes read during an automatic (and manual) non-print operation. The non-print relay NP is thereupon energized through the contacts 7 and 8 of the automatic non-print relay ANP, the now closed contacts 12L and 13L of the switch relay SW, and the reader contacts 4 and 5 of the printer reader common contact PRCC when the latter close at the completion of the reader cycle during which the automatic non-print code 3-4-5 was read. The non-print relay NP is held through its now closed contacts 9 and 10 and the contacts 3 and 4 of the reader common contacts PRCC during a reader cycle and continues to remain energized at the end of the reader cycle in the manner last explained, it being noted that the contacts 3 and 4 of the reader common contacts PRCC and its contacts 4 and 5 both make before break during the reader cycle. The functions performed by the non-print relay NP are those just described with respect to the manual non-print operation and will not be repeated. There are, however, one or two differences, aside from the manner of terminating the operations, between the automatic non-print and manual non-print operations which will now be considered.

It was previously explained that the hold circuit of the reader control relay PRCR extended through the stop code contacts of the reader contact bank 13; in the automatic non-print operation the latter stop code contacts are no longer included in the hold circuit of the relay PRCR which now extends through the now closed contacts 8L-9L of the switch relay SW, the now closed contacts 15 and 16 of the automatic non-print relay ANP, and the normally closed contacts of the stop switches S4 and S5. Thus a stop code 1-2-4 read by the printer reader is no longer effective to terminate an automatic non-print operation, which can be terminated only by reading a print restore code 3–4–6 by the bank of reader contacts 13 to interrupt the hold circuit for the relay ANP. Also whereas the manual non-print operation can be terminated by manual actuation of the printer stop switch S5, in the automatic non-print operation actuation of the switch S5 to close its contacts S5b now establishes an alternate holding circuit for the reader control relay PRCR to prevent termination of the automatic non-print operation by actuation of the switch S5. This holding circuit may be traced from the contacts S5b of the printer stop switch S5 and through the now closed contacts 2 and 3 of the automatic non-print relay ANP to the hold circuit last mentioned. During an automatic non-print operation, operation of the manual non-print switch is ineffective to energize the manual non-print relay MNP since this energizing circuit is interrupted at the normally closed contacts 21 and 22 of the automatic non-print relay ANP.

The significant purpose of the switch 15 earlier mentioned has relation to the recording or non-recording in the by-product tape of the print restore code. With the switch 15 positioned to complete the energizing circuit of the punch clutch magnet and punch magnets only through the contacts 3 and 4 of the delay control relay RDC, a print restore code 3–4–6 is not effective to interrupt this energizing circuit and the print restore code read by the reader is thus recorded in the by-product tape. Transfer of the switch 15 to complete the energizing circuit for the punch through the now closed contacts 5 and 6 of the automatic non-print relay ANP and the reader contact bank 13 causes this energizing circuit to become deenergized upon reading a print restore code and the latter is accordingly not recorded in the by-product tape.

A skip operation may also be initiated manually and is terminated either by reading a skip restore code 1–3–4 or by manual actuation of the stop read switch S4 or S5. A manual skip operation is initiated by actuation of the skip switch S8 to close its contacts S8b and to open its contacts S8a. The latter interrupt the energizing circuit of the printer reader clutch magnet PRC, and the contacts S8b effect energization of a skip control relay SCR through normally closed contacts 1 and 2 of the manual non-print relay MNP. The skip control relay SCR upon picking up establishes a hold circuit through its now closed contacts 8 and 9, the now closed contacts 5 and 6 of the reader control relay PRCR, and the skip restore code 1–3–4 contacts of the reader contact bank 13. Since the contact bank 13 interprets only five of eight possible code bits in so far as the skip restore code is concerned, two additional code bits if present are recognized by supplying the energizations from the sixth and seventh code level reader contacts (corresponding to PRC1) through the normally open contacts 11–12 and 13–14 to the relay SCR to maintain the latter energized should either a sixth or seventh level code bit be read by the reader. The now closed contacts 1 and 2 of the skip control relay SCR directly energize a reader skip relay PSR, but the latter may also hold through its now closed contacts 3 and 4 and the normally open contacts S4b or S5b of the stop switches S4 and S5 should either of the latter be manually actuated.

At the same time, the contacts 17 and 18 of the relay SCR energize the relay PRCR, and the contacts 19 and 20 of the skip control relay SCR establish a hold circuit for the read control relay PRCR around the stop code contacts of the reader contact bank 13 to insure that a skip operation shall not be terminated by reading a stop code. The now closed contacts 4 and 5 of the skip relay PSR bypass the printer cam actuated contacts TC4 to maintain the printer translator clutch TC continuously energized, and the now closed contacts 7–8 and 18–19 of the skip relay PSR maintain the translator magnets 5 and 8 continuously energized which has the effect on the translator operation that it prevents selection by the translator of any printer keylever including the carriage return keylever. While the skip operation is in progress, the contacts 1 and 2 of the skip relay PSR deenergize the reader contact bank 14 so that no new automatic type of printer operation may be effected by reading an operational code. Thus an automatic non-print code 3–4–5 if read at this time is ineffective to initiate an automatic non-print operation.

Certain functions of the printer require a delay in the reader operation until the printer function is completed. Typical of these is the carriage return and tabulate operations. For these operations, printer contacts STDC are keylever actuated to energize a delay control relay DCR which thereupon maintains a hold circuit for itself through its contacts 1 and 2, the start read switch S6, the non-print switch S7, the skip switch S8, the start read switch S1, and the carriage return and tabulation contacts CRTC which open as soon as the carriage return or tabulation operation starts and remain open to its completion. Thus the delay control relay DCR is only briefly energized to perform certain functions to the required delay. The normally closed contacts 13 and 14 of the delay control relay DRC open upon energization of this relay to interrupt the energizing circuit of the printer reader clutch magnet PRC and halt the printer operation which does not resume until the contacts CRTC again close, and the normally closed contacts 3 and 4 of the reader delay control relay DCR open to deenergize the energizing circuit through the switch 15 of the printer code translator and by-product tape punch until the delay control relay DCR is again deenergized when the carriage return and tabulating contacts CRTC open.

(2) *Duplex (non-synchronous) operation under control of the motorized reader*

The system operation under control of the motorized reader is quite similar to that previously described for the printer reader.

The system includes a motorized reader start read switch S6 which is manually actuated to close its contacts S6b and place the reader in operation by energization of the motor read control relay MRCR while concurrently energizing the switch relay magnet MRS through the normally closed contacts 4 and 5 of the relay TCC1 to transfer the numerous contacts of the switch relay SW and reverse their open circuit and closed circuit positions as shown in the drawings. As previously noted, the switch relay SW when thus energized latches its contacts in their transferred position.

If the last previous reading operation had been by use of the motorized reader whereby the contacts of the relay SW had been latched in their transferred position, it is to be noted that the energization of the motor read control relay MRCR may also be effected by manual actuation of the printer start read switch S1 to close its contacts S1b. This enables an operator to resume operations without having to remember whether the operation was halted while the printer reader of the motorized reader was being used and thus avoids the need for the operator to remember which of the read switches S1 or S6 should be manually actuated to resume operations with the proper reader. The preceding description of the printer reader operation was premised upon concurrent manual actuations of the printer start read switch S1 and the duplex switch S2 to insure that the switch unlatch magnet PRS be energized and thus insure that the contacts of the switch relay SW should be in unlatched position. Consider, however, what the result would be if the printer start read switch S1 were manually actuated without concurrent manual actuation of the duplex switch S2. Assume first that the contacts of the switch relay SW are in unlatched position at this time. The contacts S1b of the switch S1 when now closed will energize the printer read control relay PRCR and the latter will hold through the hold circuit previously described and which includes the stop contacts of the reader bank 13 and the now closed contacts 18L and 19L of the switch relay SW. Assume on the other hand that the switch relay SW contacts are in latched position when the switch S1 is actuated. Again the reader control relay PRCR is energized, but the contacts 18L and 19L of the switch relay SW are now open so there is no held circuit for the relay PRCR when the read switch S1 released to open its contacts S1b. Now, however, the latch magnet MRS of the switch relay SW is energized from the energizing circuit of the relay PRCR through the contacts S2b of the duplex switch S2 and the now closed contacts 8R and 9R of the switch relay SW, and the motorized reader control relay MRCR is concurrently energized through the normally closed contacts 4 and 5 of the relay TCC1. This is the same energization as accomplished by the previously described actuation of the motor start read switch S6.

A hold circuit for the motorized reader control relay MRCR is established through its contacts 13 and 14, the normally closed contacts 13 and 14 of the punch error relay PER, the motor reader tight tape contacts MSTT (which are normally closed but open upon the tape becoming excessively tight for any reason during operation of this reader), the motor reader tape contacts MSRT which are closed when tape is positioned in the reader in readiness to be read, the stop-code 1–2–4 reader contacts of the motor reader contact bank 16, the now closed contacts 12R and 13R of the switch relay SW, and the normally closed contacts S4a of the motor stop switch S4 and the normally closed contacts S5a of the printer reader stop switch S5.

As soon as the read control relay MRCR is thus energized, its now closed contacts 15 and 16 energize a control delay relay CDR through a circuit which includes the normally closed contacts 17 and 18 of the relay CR1. The relay CDR holds through normally closed contacts 17 and 18 of a motor search relay MSR, its own now closed contacts 15 and 16, the normally closed contacts 5 and 6 of the relay CR1, and the normally closed contacts of the stop switches S4 and S5. The relays CR1 and CR2 are now energized by the now closed contacts 5 and 6 of the relay CDR, this energizing circuit including the normally closed contacts 13 and 14 of relays CRR and CSR. The relay CR1 upon becoming thus energized opens its contacts 5 and 6 and 17 and 18 to deenergize the delay control relay CDR, and both relays CR1 and CR2 now hold through a circuit which includes the contacts 3 and 4 of a motor search relay MSR and either the normally closed contacts 2 and 3 of a motor reader common contact MRCC and the now closed contacts 5 and 6 of the relay MRCR or the normally open contacts 1 and 2 of the reader common contact MRCC (which make before the MRCC contacts 2 and 3 break and vice versa) and the now closed contacts 1 and 2 of the relay CR1, and the normally closed contacts 3 and 4 of the control delay relay CDR.

Energization of the relays CR1 and CR2 now places the motor reader in operation by energization of its read clutch MRC through the cam actuated contacts 20 of the motor reader which close at 280° of one reader cycle and open at 20° of the next reader cycle and which are thus closed when the motor reader is quiescent, the now closed contacts 7 and 8 of the read control relay MRCR, the normally closed contacts 11 and 12 of the motor search relay MSR, the normally closed contacts 11 and 12 of the relay FCR (the latter being deenergized when the contacts 1L, 2L and 3L of the switch relay SW transferred), the now closed contacts 1L and 2L of the switch relay SW, normally closed contacts 11 and 12 of a relay TCC2, the normally closed cam-actuated contacts TC1 of the printer, the normally closed contacts 13 and 14 of the delay control relay DCR, and the normally closed contacts of the switches S6, S7, S8, S1 and contacts CRTC.

The motorized tape reader in being thus placed in operation reads successive data code groups and its reader contacts, of which only the first-code-level contact MRC1 is shown, energize corresponding ones of the printer translator magnets such as the first-level magnet TC1 or punch magnets such as the first-level magnet P1. It will be understood that, as in the case of the printer tape reader contacts PRC1, there are higher-level code-bit motor reader contacts not shown for simplicity, and that these energize higher level printer translator magnets and punch magnets also not shown for simplicity as previously explained. The energizing circuit for the motor reader contacts, as contacts MRC1, extends through the now closed contacts 1 and 2 of the relay CR2, the contacts 17 and 18 of the relay CR2 and the normally closed contacts 13 and 14 of the non-print relay NP to the remainder of the energizing circuit as described with respect to the operation of the printer tape reader. Also in similar fashion to the latter, the contacts 8 and 9 of the motorized reader common contact MRCC effect energization of the motor reader contacts MRC1 and the translator clutch TC of the printer through the now closed contacts 1 and 2 of a code skip relay CSR, the contacts 1 and 2 of a code read relay CRR, the normally closed contacts 17 and 18 of the relay TCC1, the now closed contacts 12 and 13 of the relay CR1, and the printer cam-actuated contacts TC4. This energizing circuit and its general operation are similar to that previously described with respect to the printer tape reader.

Thus the motor reader clutch MRC upon being energized initiates a cycle of operation of the motor reader to read a data code group to the printer. This data may also be recorded by the by-product tape punch, if such is desired, in the manner previously described. The motor reader having initiated the printer through a cycle of operation is, however, prevented from itself starting a new cycle of reader operation since the motor reader clutch MRC is deenergized by the opening of the printer cam-actuated contacts TC1 at the 9° point of the newly initiated printer cycle. The motor reader has a partial revolution clutch which halts the reader at the 0° and 220° positions in its cycle. In the present type of operation, the motor reader clutch MRC is always energized at the 220° cyclic position through the motor reader cam-actuated contacts 24, the normally closed contacts 11 and 12 of the relay CDR, and the normally closed contacts 11 and 12 of the relay TCC1. The next motor reader reading cycle begins near the end of the printer cycle when the printer cam-actuated contacts TC1 close at 265° of the printer cycle to reenergize the reader clutch magnet MRC at its 0° cyclic position. It is in this manner that the normal higher reading rate of the motor reader is reduced to the lower cyclic operating rate of the printer during all read out of data information from the motor reader to the printer.

The motorized reader having thus been placed in operation will continue to read, as in the case of the printer reader, until the motorized reader reads a stop code 1–2–4 by its contact bank 16 to interrupt the hold circuit and thus drop out the reader control relay MRCR or until either of the stop switches S4 or S5 is manually actuated for the same purpose. Thus this mode of operation of the motorized reader is in all respects analogous to that of the printer reader earlier described, and data information may thus be read from the punched tape or card of either for reproduction by the printer or recording by a by-product tape punch or both.

As with the printer reader, the motorized reader may read an automatic non-print code 3–4–5 by its contact bank 19 to energize the automatic non-print relay ANP which energizes the non-print relay NP through the now closed contacts 11L and 12L of the switch relay SW, the normally closed contacts 1 and 2 of the motor reader common contacts MRCC, the now closed contacts 15 and 16 of the relay CR1, and the normally closed contacts 1 and 2 of the relay FCR. This effects an automatic non-print operation in a manner similar to that earlier described but utilizing the motor reader contact bank 16 to read a print restore code supplied through the now closed contacts 4L–5L, 14L–15L, 5R–6R of the switch relay SW and the diode rectifiers CR7–CR10. A manual non-print operation may also be effected by manual actuation of the non-print switch S7 to energize the manual non-print relay MNP which in turn energizes the non-print relay NP and energizes MRCR (all thereafter being held to the end of each motor reader cycle through the contacts 2 and 3 of the motor reader common contacts MRCC). A manual skip operation is initiated as previously described, and is terminated by reading a skip restore code by the motor reader contact bank 16.

(3) *Manual data search-non-synchronous mode of system operation*

As previously pointed out, one of the two principal functions of the motorized reader is to read tape wherein information is recorded as information items or blocks of information preceded by an identifying address. The address of any information thus desired must be supplied to the motorized reader before it can begin its search for such information. The identifying address of desired information is usually supplied manually for a manual data search operation, but may have been previously supplied and stored from a punched tape or card read by the printer reader.

An address is manually supplied by manual actuation of address selection switches S12, of which only the first-level address switch is here shown for simplicity but it will be understood that similar address switches for the code levels two through seven are provided and are manually set, to energize a first-level-code-storage relay R1 (and corresponding other higher-code-level storage relays not shown) upon energization of a motor search relay MSR in a manner presently to be explained. In this, the electrical circuitry including for each code level a set of motor reader contacts, address switch, storage relay, and individual pair of relay ASR contacts is like that shown for the first code level. Each of the switches S12 remains with its contacts closed when manually actuated to its address selection position, and remains with its contacts open when manually actuated to its non-selection position. Upon completion of manual setting of the address switches S12 to the desired address identity of information sought, a motor search operation is manually initiated by actuation of a motor search switch S21 to open its contacts S21a and close its contacts S21b.

Assume that at the time of actuation of the switch S21 the switch relay SW had been left by the preceding operation with its contacts latched up in transferred position (i.e. the relay winding MRS had been energized later in point of time than the unlatch relay winding PRS). The contacts S21b now complete an energizing circuit for a motor search relay MSR through the motor reader cam-actuated contacts 22, which are closed between 264° of one motor reader cycle and 190° of the next cycle and thus are closed when the motor reader is stopped, and the normally closed contacts 1 and 2 of a motor reader control relay MRCR. The motor search switch contacts S21b now also energize the address storage relays such as R1 and other like storage relays in accordance with the manual setting of the address selection switches S12 which as earlier mentioned remain set in their closed circuit or open circuit positions.

The storage relays R1 include contacts in a coincidence circuit 18; in particular, the first-code-level storage relay R1 has normally open contacts 2 and 3 which are in series with normally closed first-level code reading contacts 10 and 11 of the motorized reader contact assembly MRC1 and the relay R1 also includes normally closed contacts 1 and 2 connected in series with normally open first-level code reading contacts 9 and 10 of the motor reader contact assembly MRC1. Thus if the storage relay R1 should be selected by operation of the switch S12, the relay contacts 2 and 3 of the relay R1 would complete an electrically continuous circuit between the conductors 22 and 23 of the coincidence circuit 18 through the normally closed first-level code reading contacts 10 and 11 of the motor reader contact assembly MRC1. This electrical circuit continuity is interrupted if the motor reader reads a one-level code and thereby opens its first-level contacts 10 and 11 and closes its first-level contacts 9 and 10. Since there are similar arrangements of storage relay contacts associated with each pair of higher-level code reader contacts of the motorized reader, it will be appreciated that the coincidence circuit will maintain at least one continuous electrical circuit between its conductors 22 and 23 unless the code read by the motor reader is precisely the same as that identified by the address storage relays R1 selected by operation of the switches S12 and unless as a further condition an 8 level code is read to open the 8th level code reader contacts 7 and 8 of the motor reader contact assembly MRC8. It will be recalled that an address is always identified by the use of an 8th level code bit, and it is for this reason that the coincidence circuit must find an 8th level code bit as well as coincidence between identity of the address storage relay contact settings and the code reader contact positioning before coincidence of the address selected by the address storage relays and that read by the code reader is established.

As soon as the motor search relay MSR is energized in the manner just explained, it establishes a hold circuit for itself through the coincidence circuit 18 at the reading position of the reader contacts or through the motor reader cam-actuated contacts 22M from 264° of one reader cycle to 190° of the next cycle, the now closed contacts 1 and 2 of the search relay MSR, the motor reader tight tape contacts MSTT, the code reader tape contacts MSRT, the now closed contacts 15 and 16 of the motor search relay MSR, the normally closed contacts of the motor stop read switch S4, and the normally closed contacts of the printer stop read switch S5. The now closed contacts 7–8 and 15–16 of the motor search relay MSR also establish an energizing circuit for the motor reader control relay MRCR around the stop code 1–2–4 contacts of the motor reader contact bank 16 so that the motor reader control relay MRCR is not deenergized during a search operation by reason of the reading of a stop code by the motor reader. The contacts 3 and 4 of the motor search relay MSR open to deenergize the relays CR1 and CR2, if energized, so that the motor reader contacts have no control over the code translator of the printer or the by-produce tape punch.

Now when the motor search switch S21 is manually released to close its contacts S21a, a new energizing circuit is established for the motor reader clutch magnet MRC to place the motor reader in operation. This energizing circuit includes the cam actuated motor reader contacts 20 which open at 20° and close at 280° of each motor reader cycle, the now closed contacts 7 and 8 of the read control relay MRCR, the now closed contacts 12 and 13 of the motor search relay MSR, the normally closed contacts 3 and 4 of a relay ASR, the normally closed contacts 3 and 4 of the relay CR1, and the normally closed contacts of the switches S21, S4 and S5. The motor reader clutch magnet MRC is energized by the cam-actuated contacts 20 at the 0° cyclic position of the motor reader, and motor reader cam-actuated contacts 24 continue to energize the reader clutch magnet MRC at the 220° cyclic reading position through an energizing circuit which includes either the normally closed contacts 11 and 12 of a control delay relay CDR and the normally closed contacts 11 and 12 of a relay TCC1 or the normally open reader tape contacts RTC which close only when the end of the tape in the reader is sensed. Since the 0° and 220° energizing circuits of the reader clutch magnet MRC are effective continuously to energize the motor reader through successive cycles of reading operation (and independently of the printer cam-actuated contacts TC1) so long as the motor search relay MSR remains energized, the search proceeds independently and at a relatively high reading rate. As soon as the motor reader reads an address corresponding to that stored in the address storage relays R1, the electrical continuity of the coincidence circuit 18 is interrupted to deenergize the motor search relay MSR. This halts the search operation of the motor reader at its 0° cyclic position and conditions it to read out the next information item or block of information in a manner now to be explained.

As soon as the motor search relay MSR becomes deenergized as last mentioned, its contacts 3 and 4 close and the relays CR1 and CR2 are energized in the manner previously explained. The motor reader is now conditioned to effect automatic control of the printer operations or by-product tape punch in the manner previously described. The motor reader clutch magnet MCR is energized at this time through a circuit which includes both the cam-actuated contacts 20 of the motor reader an dthe cam-actuated contacts TC1 of the printer, which open at 9° and close at 265° of each printer cycle. Thus while the motor reader reads at a high reading rate during search operations, since the reader clutch energizing circuit does not include the cam-actuated contacts TC1 of the printer, it is so controlled by the printer cam-actuated contacts TC1 during data read out to the printer in the manner above described that the motor reader rate is now reduced to that of the printer. Accordingly the motor reader reading rate is much lower as long as the motor reader is reading data information out to the printer for reproduction. This holds true also during manual and automatic non-print operations of the printer where the latter continues to operate through successive cycles although effecting no printing of data information, thus insuring that the motor reader is maintained at a lower reading rate consistent with the recording of information at such lower rate in a by-product tape punch when selected.

The read out of data information from the motor reader continues until the reader reads either a stop code 1-2-4 or an address identity code 1-3-4-5-7 which requests a further automatic search for information. A stop code 1-2-4 when now read by the motor reader contact bank 16 is effective to interrupt the hold circuit of the motor read control relay MRCR since this circuit is no longer bypassed around the motor reader contacts by reason of the now open contacts 15 and 16 of the motor search relay MSR. If the motor read control relay MRCR is so deenergized, its contacts 7 and 8 open to interrupt the energizing circuit of the motor reader clutch magnet MRC and thereby terminate operation of the motor reader. If on the other hand the motor reader bank of contacts 19 should read an address identity code 1-3-4-5-7, the motor search relay MSR is again energized through the coincidence circuit 18, the now closed contacts 2 and 3 of the motor read control relay MRCR, the normally closed contacts 4 and 5 of the relay TCC2, the address identity contacts of the contact bank 19, the now closed contacts 7 and 8 of the relay CR1, normally closed contacts 1 and 2 of the skip relay PSR normally closed contacts 11 and 12 of the manual non-print control relay MNP, and the normally closed contacts 13 and 14 of the automatic non-print relay ANP. This reenergization of the motor search relay MSR will terminate read-out of data information by deenergizing the relays CR1 and CR2 and initiate a new search to locate data at an address corresponding to that stored in the address storage relays R1. This new search operation and the subsequent read out of data information following location of the information addressed will proceed in the manner just described. It will accordingly be apparent that where a data information item or block of information is terminated by an address identity code, all recorded information of the same address may be collated and read out to the printer by successive repeat search operations automatically performed. It should also be noted that the address of the information for which a repeat search is desired may be changed at any time by manual re-positioning of the address identity switches S12.

A repeat search thus repetitively initiated will continue until a data information item or block of information is terminated by a stop code 1-2-4 to halt the search as above explained or until either of the stop switches S4 or S5 is actuated to deenergize the hold circuit of the motor read control relay MRCR by opening the contacts S4a or S5a of the switches S4 or S5. This actuation of the stop switch S4 or S5 will also halt a search in progress by deenergizing the motor search relay MRS as well as the read control relay MRCR, the relays CR1 and CR2 if energized at this time nevertheless being temporarily maintained energized (to complete the read out of a data item to the printer) until the stop switch S4 or S5 is manually released. This energizing circuit for the latter relays includes the normally closed contacts 3 and 4 of the control delay relay CDR, the now closed contacts 1 and 2 of the relay CR1, a diode rectifier CR3, the manually closed contacts S4b of the switch S4 and the normally closed contacts of the switch S5 or the manually closed contacts S5b of the switch S5.

During the progress of a search operation by the motor reader, any functional control codes read by the motor reader contact bank 19 are ignored since the energization of this reader bank is interrupted by the normally open contacts 7 and 8 of the relay CR1 which is deenergized during a search operation.

It was assumed during the preceding explanation of the search operation that it was initiated at a time when the switch relay SW had been left with its contacts latched up in a transferred position (i.e. that the relay winding MRS had been energized later in point of time than the unlatch relay winding PRS). Consider now the changed mode of search operation which results when the switch relay SW has its contacts in the unlatched position (the relay winding PRS last energized) at the time the motor search switch S21 is manually actuated. The search operation proceeds as above described by energization of the search relay MSR and control relay MRCR, but now when coincidence of addresses deenergizes the search relay MSR the control relay MRCR is also deenergized since its hold circuit is interrupted by the now open contacts 15 and 16 of the search relay MSR and by the normally open contacts 12R and 13R of the switch relay SW. With the control relay MRCR thus deenergized, the motor reader operation is halted since the reader clutch magnet MRC energization is interrupted by the normally open contacts 7 and 8 of the control relay MRCR. The motor reader having thus completed the search, and standing in readiness to read out data information having the address sought, awaits further control to effect such read out.

(4) *Duplex (non-synchronous) operation-system operation under alternate control of the printer reader and the motor reader*

Data information may be alternately supplied, automatically under program control, from both the printer reader and motor reader. This mode of operation also provides an additional mode of search operation by the motor reader. These new and different modes of operation will now be considered.

(a) *Duplex operation.*—The system as earlier mentioned includes a manually actuable duplex switch S3 which may be manually actuated to switch-open or switch-closed positions and which remains in the position to which it is manually set. For the operation here considered, the duplex switch S3 is manually actuated to its open contact position. A switch code 2-3-4 read by the printer reader contact bank 14 effects energization of the switch relay magnet MRS through the normally closed contacts 4 and 5 of the relay TCC1 and of the motorized reader read control relay MRCR in the same manner as manual actuation of the motor start read switch S6. This transfers the reading operation from the printer reader to the motor reader. A switch code 2-3-4 now read by the motor reader contact bank 19 energizes the switch relay winding PRS and through a diode rectifier CR6 energizes the print reader control relay PRCR much in the same manner as manual actuation of the printer start read switch S1, thus terminating reading by the motor reader and initiating reading by the printer reader. Accordingly a switch code read by either reader transfers the reading operation to the other until such time as the other reader itself reads a switch code to return reading to the first reader. Since the reader contact banks 14 and 19 are energized through the normally closed contacts 1 and 2 of the skip relay PRS, the contacts 11 and 12 of the manual non-print relay MNP, and the contacts 13 and 14 of the automatic non-print relay ANP, it is apparent that a switch code 2-3-4 read during either form of non-print operation or during a skip operation is ignored by the system and does not effect transfer of reading to the other reader. The operation of either reader when operating is otherwise, however, than heretofore described.

(*b*) *Data information search initiated by the printer reader.*—When the duplex switch S3 has been manually actuated to open its contacts, it becomes possible for the printer reader to initiate an information search by the motor reader. Having initiated the search, the printer reader may continue reading data information to the printer or by-product tape punch and the motor reader concurrently performs its search operation independently. If the motor reader completes its search before a switch code 2-3-4 is read by the printer reader, the motor reader operation halts in readiness to read the addressed data information; it proceeds to do so when a switch code read by the printer reader transfers the read operation to the motor reader. If the switch code is read prior to the time the motor reader has completed its search operation, all reading halts until the search operation is finished whereupon the motor reader immediately begins to read data information out to the printer and by-product tape punch. The precise manner in which these several operations occur will be evident from the foregoing description of search operations by the motor reader and of the duplex (non-synchronous) mode of operation by which reading is transferred between the motor reader and the printer reader.

When the printer reader initiates a search by the motor reader, it normally furnishes the address identity of the data which is the subject of the search. In doing this, the printer reader contact bank 14 will read an AID (address identification) code 1-3-4-5-7 which thereupon energizes relay AR1. The contacts 4 and 5 of the latter relay now close to pick up relay AR2, the relay AR1 being held through its normally open contacts 16 and 17, the normally closed contacts 13 and 14 of relay AR2, the normally closed contacts 14 and 15 of the motor search relay MRS, and the normally closed contacts of the motor stop switch S4 and print reader stop switch S5. Thus as soon as the relay AR2 picks up, its contacts 13 and 14 open to deenergize the hold circuit last described for the relay AR1, the relay AR2 now holding through its normally open contacts 14 and 15 and the hold circuit last mentioned. The normally open contacts 4 and 5 of the relay AR2 now close to pick up an auto select relay ASR through the now closed contacts 3 and 4 of the relay AR1 from the energizing circuit last mentioned.

The next code read by the printer reader is an address code of the information to be located by the search, and the printer reader contacts PRC1 (together with other higher level code contacts not shown) energize the storage relays R1 through the normally open contacts 6 and 7 of the relay ASR (there being a higher code-level storage relay and a corresponding pair of contacts of the relay ASR associated with each higher level reader contact of the reader) thus storing the address of the data to be located. Preparatory to storing this address, it will be noted that any previously energized address storage relay R1 was maintained energized by a hold circuit which includes the normally open contacts 4 and 5 of the relay R1, and a jumper 25 which may be connected either between the terminal 26 and (as indicated in broken lines) plug-board class hold terminals 27 to complete the hold circuit through the normally closed contacts 1 and 2 of a class hold relay RHC or between the terminal 26 and an item plug-board terminal 28 to complete the hold circuit through normally closed contacts 21 and 22 of the relay AR1 and the normally closed contacts of the switches S21, S4 and S5. It will be understood that the hold contacts 4–5 of others of the address storage relays not shown may similarly be connected to either of the plug-board terminals 27 and 28. Assuming for the moment that all of the relay R1 hold circuits extend by way of plug-board terminals 28, the normally closed contacts 21 and 22 of the relay AR1 open when the latter is energized as last mentioned and thus interrupt the holding circuit of any address storage relays R1 previously energized. The energization of the relay AR1 accordingly serves to erase any address previously stored in the storage relays R1 and prepare the latter to store the new address read from the printer reader. In preparation for this automatic search operation, all of the manual address select switches S12 are manually moved to open their contacts. In thus storing the address in the storage relays R1, it may be noted that the normally open contacts 16 and 17 of the relay AR2 are now closed which thus energizes the 8-level translator magnet of the printer. Such energization prevents selection of all printer keylevers except the carriage return keylever, but selection of the latter at this time is prevented by the fact that the address includes code bits which energize other translator magnets and thereby prevent carriage return keylever selection. This translator energization thus causes the address read by the printer reader to be ignored by and effect no operation of the printer.

The address storage operation just described assumed that all of the relay R1 hold circuits extended to the item plug-board terminals 28 so that all of the address relays R1 became deenergized upon opening of the normally closed contacts 21 and 22 of the relay AR1. Consider now the changed operation which prevails when a number of the storage relay hold circuits extend to the class hold plug-board terminals 27. It is evident that these storage relays are not deenergized when the relay AR1 is energized to store a new search address, but rather are retained energized through the normally closed contacts 1 and 2 of the relay RHC to retain storage of a partial address (the class address) so that the newly stored search address need only relate to items to be searched within the class. Erasure of this class address thus stored may be effected by energizing the relay RHC. This is accomplished by supplying a search address which effects energization of all item storage address relays, and thereby effects closure of the contacts 24 and 25 of all of the item and class storage relays here indicated for convenience of reference as relays R1 and R1-2 through R1-7. The relay RHC remains energized through its now closed contacts 3 and 4 and the normally closed contacts 21 and 22 of the relay AR1 so that the hold circuit of the class address relays become deenergized by opening of the contacts 1 and 2 of the relay RHC and remains so until the succeeding address storage operation effects energization of the relay AR1 and thereby deenergizes the relay RHC by interruption of its hold circuit.

The address of the data desired having been stored in the storage relays R1 as above described, the next printer cycle effects closure of the contacts 3 and 4 of the reader common contact PRCC to energize the motor search relay MSR through the now closed contacts 1 and 2 of the relay ASR. As previously explained, the normally open contacts 1 and 2 and 15 and 16 of the search relay MSR complete a hold circuit for this relay through the coincidence circuit 18 and its normally open contacts 7 and 8 establish an energizing circuit for the motor reader control relay MRCR. The normally closed contacts 14 and 15 of the relay MRS now open to interrupt the energizing circuit of the relay AR2 which, however, continues to remain energized temporarily through its now closed contacts 9 and 10 and the reader common contacts PRCC.

The contacts 4 and 5 of the relay AR2 now open to interrupt the energizing circuit of the auto select relay ASR. The motor reader clutch MRC is now energized through its high speed reader energizing circuit which includes the cam-actuated contacts 20 and 24 of the motor reader, the now closed contacts 7 and 8 of the reader control relay MRCR, the now closed contacts 12 and 13 of the search relay MSR, the normally closed contacts 3 and 4 of the relay ASR and the normally closed contacts 3 and 4 of the relay CR1, and the normally closed contacts of the manually actuable switches S21, S4 and S5.

The motor reader now begins its search at high reading rate and the search is terminated as above described when identity of addresses is found. Since the motor search is terminated by deenergization of both the search relay MSR and control relay MRCR for reasons previously mentioned, the motor reader halts awaiting the reading of a switch code 2-3-4 by the printer reader to cause the motor reader to read out the data information located by the search. Each information item or block of information so read out is normally terminated by a switch code 2-3-4 to effect return of the reading operation back to the printer reader. However should the information read out be terminated by an address identification code, rather than a switch code, repeat searching ensues for all information having the address stored in the address storage relays R1 and the last of such information can be terminnated by a stop code or a switch code as desired.

(5) Synchronous operation

In the synchronous mode of the system operation, the motorized reader programs all operations and accordingly directly controls reading operations of the printer reader. Both the motorized reader and the printer reader may supply alpha-numeric information, symbols, and functional control information for controlling the printing operations of the printer and recording operations of the by-product tape punch, there being only the difference that the printer reader ignores any program control information read by it. Function control information may thus be freely supplied by the motorized reader or step-by-step by the printer reader under command of the motorized reader, but function controls so supplied by the printer reader may only be those functions which are recognized as keylever operations by the printer.

Automatic non-printing operations may originate only under control of the motorized reader, and continue until a print restore code is read by the motorized reader. During these non-print operations, data information may be supplied to the by-product tape punch by either the motorized reader or the printer reader. Any function codes read by the printer reader during automatic non-print operations are ignored by this reader. Automatic non-print operations may be manually halted, but can not be manually stopped. A manual non-print operation affects only the motorized reader, and continues until a stop code is read by the motorized reader or until the non-print operation is manually terminated. During such manually initiated non-print operations, all program codes read by the motorized reader other than a stop code are ignored.

A manual skip operation affects only the motorized reader, and continues until a skip restore code is read by the motorized reader or the operation is manually terminated. During such skip operation, all program codes read by the motorized reader other than the skip restore code are ignored. Programmed skip by the printer-reader is under specific control of the motorized reader and is restricted to a single information item read by the printer reader for each skip command read by the motorized reader. Automatic search operations by the motorized reader are initiated in the synchronous mode of operation only under program control of the motorized reader, and the search address is now supplied by the printer reader under read control of the motorized reader. The printer reader may supply item or class portions of the address and may erase the class portion of a previously stored address in the manner heretofore described, and in addition the motorized reader may also supply either the item of class portions of the address prior to the supply of an item or class portion by the printer reader, or the motorized reader may erase in entirety a previously stored address prior to the subsequent supply of item and class portions of the address by the printer reader. When an automatic search operation is initiated, which automatically takes place upon read-out of an address from the printer reader, read-out of both the motorized reader and printer reader halts until the automatic search operation is completed. Repeat searches automatically following one another in the manner heretofore described are not used in the synchronous mode of system operation.

The system is placed in the synchronous mode of operation by manual actuation of the duplex switch S3 to its closed contact position by which the relays TCC1 and TCC2 are energized through the normally closed contacts 3 and 4 of the search relay MSR. The electromagnet MRS of the switch relay SW is thereupon energized by the now closed contacts 5 and 6 of the relay TCC1, and manual actuation of either the motor start read switch S6 or the printer start read switch S1 effects energization of the motor read control relay MRCR and concurrently effects energization of the printer read control relay PRCR through the now closed contacts 15 and 16 of the relay TCC2. The relay MRCR holds through its now closed contacts 13 and 14 and the stop code contacts of the motorized reader contact bank 16. The relay PRCR holds through its now closed contacts 1 and 2, the tape contacts PSRT, and now closed contacts 9 and 10 of the relay TCC2 to the holding circuit of the relay MRCR.

Upon energization of the relay MRCR, its contacts 15 and 16 close to energize the control delay relay CDR through the normally closed contacts 17 and 18 of the relay CR1, this relay thereupon establishing a hold circuit for itself through its normally open contacts 15 and 16 and the normally closed contacts of the motor stop switch S4 and printer stop switch S5. The relay CDR thereupon closes its contacts 5 and 6 to energize the relays CR1 and CR2, as previously described, and the contacts 5–6 and 17–18 of the relay CR1 thereupon open to deenergize the relay CDR. Now upon release of the motor start read switch S6 or the printer start read switch S1, the motor reader clutch magnet MRC is energized through an energizing circuit previously described and which includes the normally closed contacts of the switches S1 and S6 so that the motorized reader is placed in reading operation. The contacts 11 and 12 of the relay TCC2 open and its contacts 12 and 13 close to exclude from the energizing circuit of the reader clutch magnet MRC the printer cam-actuated contacts TC1 so that the motorized reader clutch magnet MRC is continuously energized at its 0° cyclic position. The contacts 11–12 of the relay TCC1 open and its contacts 12–13 close to transfer control of the energization of the motor reader clutch magnet MRC at the 220° cyclic reader position to the cam-actuated contacts TC3 of the printer, thus to cause the motor reader to halt in its fast reading operation at 220° of its reading cycle until released by the printer cam-actuated contacts TC3 which close at 80° of the printer cycle and open at 140° of the latter. The contacts 17–18 of the relay TCC1 open and its contacts 18–19 close to insert the motorized reader cam-actuated contacts 30 into the energizing circuit of the translator clutch magnet TC and translator magnets TC1 and the punch clutch magnet PC and the punch magnets P1, thus restricting the energization of this circuit to the cyclic range of 215° when the contacts 30 close to 265° when the contacts 30 open in each motorized reader cycle. The reason for so inserting the cam-actuated contacts 30 is concerned with the step-by-step reading control of the printer reader by the motorized reader. For example, a switch or skip code read by the motorized reader energizes the code read relay CRR or code skip relay SR to cause one cycle of operation by the printer reader. Such code is sensed when the motorized reader contacts of its contact bank 19 close at about 81° of the reader cycle to energize the relay CRR or CSR. The cam-actuated contacts 30 thus remain open until 215° of the motorized reader cycle to prevent energization of the printer translator magnet TC or punch magnet PC by the reader common contacts MRCC until the relay CRR or CSR has become energized (if such is required) and thus open their contacts 1 and 2 to deenergize the motor reader common contacts MRCC.

With the motor reader control relay MRCR energized and its contacts 5 and 6 closed to hold the relays CR1 and CR2 energized as previously described, the translator clutch magnet TC of the printer is energized through the motorized reader common contacts MRCC and cam-actuated contacts 30 and the translator magnets TC1 are energized, through the motor reader code contacts MRC1 as previously explained. The energization of the punch clutch magnet PC and punch magnets P1 is that previously described. Thus the motorized reader reads and supplies alpha-numeric information, symbols, and function control information to the printer for control of the latter in printing information and for control of the by-product tape punch in recording such information.

A manual search operation is effected by manual operation of the switch S21, and proceeds in the manner previously described but with the one difference that the printer read control relay PRCR is now energized from the hold circuit of the relay MRCR through the now closed contacts 8 and 9 of the relay TCC1, the normally closed contacts 11 and 12 of the code skip relay CSR, and the contacts 11 and 12 of the code read relay CRR. The relay PRCR now holds as before through its now closed contacts 1 and 2.

If the non-print switch S7 should be manually actuated during operation of the motorized reader, the manual non-print relay MNP and non-print relay NP are energized in the manner previously explained, and both hold from the hold circuit of the relay MRCR through the now closed contacts 2R and 3R of the switch relay SW, the contacts 7–8 and 13–14 of the relay MNP, and the now closed contacts 16–17 of the relay NP. The non-print relays will accordingly hold until a stop code 1–2–4 is read by the motorized reader or until the motor stop switch S4 or printer stop switch S5 is manually actuated to interrupt the hold circuit of the motor reader control relay MRCR and thus the hold circuit of the non-print relays (noting, however, that manual actuation of the stop switch S4 to close its contacts S4b or of the switch S5 to close its contacts S5b is effective to hold the non-print relays until the stop switch is manually released, after which the relays may hold only temporarily through the rectifier CR2 and motor reader common contacts MRCC 2 and 3 in the event that the relay CR1 contacts 15 and 16 have not yet opened).

Automatic non-print operations are effected when the motorized reader reads a non-print code 3–4–5 to energize the automatic non-print relay ANP and the non-print relay NP to accomplish a non-print operation in the manner previously described. In addition, the now closed contacts 17 and 18 of the relay TCC2 energize a motor automatic non-print relay MANP to close its contacts 7–8 and 18–19 and thus establish a hold circuit for the non-print relays which excludes the rectifier CR2, contacts 14 and 15 of the relay TCC1, and contacts 15 and 16 of the relay CR1. The contacts 15 and 16 of the motor automatic non-print relay MANP also close to maintain energization of the motor reader contact bank 19 during the automatic non-print operation, so that the printer reader may be controlled in a manner presently to be described, by a switch code 2–3–4 read by the motorized reader during the non-print operation and thus enable data information to be supplied to the by-product tape punch by either the motorized reader or printer reader during the automatic non-print operation.

Manual actuation of the skip switch S8 effects energization of the skip control relay SCR and skip relay PSR and accomplishes a skip operation in the manner previously described. The hold circuit for the relay SCR includes its now closed contacts 8 and 9, the now closed contacts 5 and 6 of the printer read control relay PRCR and in parallel therewith the now closed contacts 17 and 18 of the motorized reader control relay MRCR, the contacts 4L and 5L of the switch relay SW, the normally closed contacts 5 and 6 of the motor automatic non-print relay MANP, the now closed contacts 19 and 20 of the relay TCC2, and the rectifiers CR7–CR10 to the motorized reader contact bank 16 which is energized at this time through the now closed contacts 12R and 13R of the switch relay SW. The skip operation thus continues until a skip restore code 1–3–4 is read by the motorized reader contact bank 16 or until the motor stop switch S4 or printer stop switch S5 is manually actuated (noting, however, that the manual actuation of switch S4 or S5 to close their respective contacts S4b or S5b maintains the relay PSR energized through its now closed contacts 3 and 4 until the switch S4 or S5 is manually released. Contacts 15 and 16 of the skip control relay SCR are shunted around the contacts 13 and 14 of the motor read control relay MRCR to pick up the latter when the skip switch S8 is manually actuated.

A switch code 2–3–4 when read by the motorized reader in the synchronous mode of system operation treats this code as a read-1 code by which to effect the reading of one item of data information (one tabulating card column, for example) by the printer reader. To this end, a code read relay CRR is energized through the now closed contacts 2 and 3 of the relay TCC1 by the switch code (read-1) output of the motorized reader contact bank 19. The motor reader contacts of its bank 19 remain closed until about 266° of the reader cycle, and the relay CRR holds through its now closed contacts 18 and 19, the normally closed contacts 3 and 4 of a code skip relay CSR, and the cam-actuated contacts 29 of the motorized reader which are closed from 245° of one reader cycle to 90° of the next reader cycle. The control relay CRR now energizes the control delay relay CDR through the normally closed contacts 17 and 18 of the motor search relay MSR, the now closed contacts 9 and 10 of the relay CRR, and the normally closed contacts of the stop switches S4 and S5. The contacts 11–12 and 12–13 of the relay CDR now transfer to cause the printer reader common contacts PRCC to energize the motor reader clutch magnet MRC past its 220° cyclic position through the now closed contacts 15 and 16 of the relay TCC1. This causes the motorized reader to halt for one cycle in its operation while the printer reader is executing a cycle of operation.

The normally closed contacts 3 and 4 of the relay CDR now open to deenergize the relays CR1 and CR2. The now closed contacts 1 and 2 of the relay CDR maintain the motorized reader contact bank 19 energized, even though the contacts 7 and 8 of the relay CR1 open, thus to maintain the motorized reader contact bank 19 energized to read successive switch (read-1) codes. Note in this respect that two successive such codes should reenergize the relay CRR at about 81° when the reader contacts close and before the hold circuit for this relay is interrupted by the reader cam-actuated contacts 29 at 90° of the reader cycle so that this relay and the relay CDR remain energized and the relays CR1 and CR2 deenergized through successive reader cycles when successive switch (read-1) codes are read. The contacts 1–2 and 17–18 of the relay CR2 thereupon open to terminate energization of the translator magnet TC1 of the printer by the motor reader code contacts MRC1, and the contacts 12 and 13 of the relay CR1 open to terminate energization of the translator clutch TC by the motor reader common contacts MRCC. Thus the translator clutch TC and translator magnets TC1 must be energized by the printer reader common contacts PRCC and code reading contacts PRC1. The contacts 16 and 17 of the relay CRR energize the printer reader clutch magnet PRC through the now closed contacts 3 and 4 of the printer read control relay PRCR so that the printer reader executes a cycle of operation and in doing so energizes the motorized reader clutch MRC past its 220° cyclic position. The read control relay CRR becomes deenergized at 90° of the next motor reader cycle unless a further switch (read-1) code is read by the motorized reader to maintain relay CRR energized as earlier explained, but the control delay relay CDR yet holds through its now closed contacts 15 and 16 and the now closed contacts 5 and 6 of the relay CR1. Accordingly the control relays CR1 and CR2 are again energized through the now closed contacts 5 and 6 of the control delay relay CDR as soon as the contacts 13 and 14 of the relay CRR close. The contacts 5-6 and 17-18 of the relay CR1 now open to deenergize the control delay relay CDR. The contacts 16 and 17 of the control relay CRR are now open, so that the printer reader clutch PRC is no longer energized beyond its one read cycle. The motorized reader thereupon resumes its normal reading operation. It may be noted that during the one cycle read operation of the printer reader, the contacts 1 and 2 of the relay TCC2 are opened to deenergize the printer reader contact bank 14 for the purpose of causing the printer reader to ignore such functional codes as non-print, switch, address identification, and data select. All such functional codes must originate in the motorized reader during the synchronous mode of system operation.

When a skip code 1-3-4-6-7 is now read by the reader contact bank 19 of the motorized reader, a code skip relay CSR is energized through the now closed contacts 7 and 8 of the relay TCC2. It is the purpose of this relay to cause the printer reader to operate through one read cycle, yet to skip the information read by it during this cycle. The relay CSR holds through the normally closed contacts 3 and 4 of the relay CRR and its own now closed contacts 4 and 5 and the cam-actuated reader contacts 29 of the motorized reader, thus holding from 245° of one motorized reader cycle to 90° of the next reader cycle. The normally closed contacts 1 and 2 of the skip relay open to prevent energization of the motorized reader common contacts MRCC when the cam-actuated contacts 30 of this reader close at 215° of the reader cycle. The now closed contacts 9 and 10 of the relay CSR energize the control delay relay CDR which effects the operations previously described in connection with the relay CRR to cause the motorized reader to halt for one reading cycle while the printer reader is caused to execute a reading cycle by energization of its reader clutch PRC through the now closed contacts 16 and 17 of the relay CSR. There is the difference as between the read-1 operation previously described and the code skip operation presently described that the contacts 7-8 and 18-19 of the skip relay CSR close to energize the 5th level and 8th level translator magnets of the printer by which a spurious code is injected into the translator to render the latter ineffective to cause any printer operation (the 8th level translator magnet energization prevents selection of all keylevers except the carriage return keylever, and the 5th level translator energization prevents the selection of the carriage return keylever). Thus the motorized reader halts for one reading cycle while the printer reader executes a reading cycle but skips the information read during this cycle.

(a) *Automatic Data Searching—Synchronous Mode of Operation*—An automatic search operation is initiated when the motorized reader contact bank 19 reads an address identification (AID) code 1-3-4-5-7 to energize the relay AR1 through the now closed contacts 5 and 6 of the relay TCC2 (the now open contacts 4 and 5 of the relay TCC2 prevent direct energization of the motor search relay MSR in the synchronous mode of operation). It will be noted that the energizing circuit of the reader contact assembly 19 includes the contacts 7 and 8 of the relay CR1 so that this relay must be energized for the AID code to effect energization of the relay AR1. The latter relay in turn effects energization of the relay AR2 which in turn energizes the automatic search relay ASR as previously described. The contacts 21 and 22 of the relay AR1 interrupt the hold circuit of any item address relays R1 previously energized (and interrupt the hold circuit of the class hold relay RHC if energized) as previously described, and the contacts 6 and 7 of the relay ASR now close to permit energization of the address storage relays R1 from the motor reader code contacts MRC1 or the print reader code contacts PRC1. Thus it may be noted that the motorized reader, after reading an AID code, may read a following partial address code to store a partial address in storage relays R1. This partial address code may supplement that which is supplied from the printer reader in a manner presently to be described, or may by appropriate energization of the class hold relay RHC effect interruption of the hold circuit of class relays previously energized and thus drop out these relays. In the latter event, a further AID code read by the motorized reader will again energize the relay AR1 to interrupt the hold circuit of the class hold relay RHC and thus prepare the storage relays R1 to receive an entirely new storage address.

Having thus energized the automatic search relay ASR in preparation for an automatic search operation, the motorized reader will read a switch code 2-3-4 (read-1) to cause the printer reader to perform a cycle of reading operation in the manner above described. This cycle of reader operation causes the printer read contacts PRC1 to energize the address storage relays R1 in the manner previously described and thus store the address of the data to be searched. During this printer read cycle, the now closed contacts 16 and 17 of the relay AR2 energize the 8th level translator magnet of the printer so that the address read by the printer reader during its cycle of operation becomes a spurious code to be ignored by the translator (the 8th code level preventing selection of all printer keylevers except the carriage return keylever which thus becomes spurious when any other code bit is also read and applied to the translator). The energization of the 8th level translator magnet also occurs during read of the AID code by the motorized reader, so that again the translator of the printer receives a spurious code and ignores it. During this reader cycle, the printer reader common contacts PRCC3 and 4 close to energize the motor search relay MSR through the now closed contacts 1 and 2 of the automatic search relay ASR. The contacts 14 and 15 of the motor search relay MSR thereupon open to interrupt the hold circuit of the relay AR2 (although the latter holds through its now closed contacts 9 and 10 and the printer reader common contacts PRCC until the latter again open near the end of the printer reader cycle), which thereupon opens its contacts 4 and 5 to deenergize the automatic search relay ASR. The motor search relay MSR now holds through the coincidence circuit contacts 18, and the contacts 3 and 4 of the motor search relay MSR open to deenergize the CR1 and CR2 relays and to deenergize the relays TCC1 and TCC2. The motor reader code contacts MRC1 (and higher level code contacts not shown) are thus disconnected from the translator magnets TC1, and the translator clutch magnet TC is disconnected from the motorized reader cam-actuated contacts 30 and the motorized reader common contacts MRCC. With the relays TCC1 and TCC2 deenergized, and the motor search relay MSR energized, the motorized reader performs a search at high reading rate as previously described until the relay MSR is deenergized by the condition of address identity as determined by the coincidence contact circuit 18. The contacts 3 and 4 of the motor search relay MSR thereupon close to reenergize the relays TCC1 and TCC2 and again reenergize relays CR1 and CR2 so that the motorized reader proceeds to read out to the printer the data information located as a result of the search operation.

The receptacles JD1 (and corresponding receptacles for the 2nd through 8th code level translator magnets not shown), JD9, and JD11 through JD16 permit (upon removal of the conductor 10 between receptacles JD13 and JD14) selection of manually inserted data as described above.

While there have been shown and described and pointed out the novel features of the invention as applied to a preferred embodiment, it will be understood that various omissions and substitutions and changes in the form and details of the system and in its operation may be made by those skilled in the art without departing from the spirit of the invention. It is the intention, therefore, to be limited only as indicated by the scope of the following claims.

What is claimed is:

1. A data translation system comprising data utilizing means, first and second cyclically operating reading means operative one at a time to read individual ones of two record media to derive during each reading cycle thereof and make available for utilization by said utilizing means an item of data and functional-control information recorded in said media, a switch means controlled by each reading of a read-control functional information item read by one of said reading means for halting the operation thereof and initiating a cycle of operation of the other of said reading means, and means actuated by said other reading means during each cycle of operation thereof for automatically initiating resumed cyclic operation of said one reading means.

2. A data translation system comprising data utilizing means, first and second cyclically operating reading means operative one at a time to read individual ones of two record media to derive during each reading cycle thereof and supply to said utilizing means items of data and functional-control information recorded in said media, a switch means controlled by each reading of a read-control functional information item read by one of said reading means for preventing utilization of said read-control information by said utilizing means and for effecting a cycle of alternation between the reading operations of said one and said other of said reading means, and means actuated by said other reading means during each cycle of operation thereof for automatically initiating cyclic resumed operation of said one reading means.

3. A data translation system comprising data utilizing means, first and second cyclically operating reading means operative one at a time to read individual ones of two record media to derive during each reading cycle thereof and supply to said utilizing means an item of data and functional-control information code recorded in said media, a switch means controlled by each reading of an item of read-control functional information read by one of said reading means for halting the operation thereof and initiating a cycle of operation of the other of said reading means while concurrently causing the generation and supply to said utilizing means of a spurious code effective to prevent the utilization thereby of said item of read-control functional information read by said one reading means, and means actuated by said other reading means during each cycle of operation thereof for automatically initiating resumed cyclic operation of said one reading means.

4. A data translation system comprising data utilizing means, first and second cyclically operating reading means operative one at a time to read individual ones of two record media to derive and make available for utilization by said utilizing means items of data and functional-control information recorded in said media, a switch means controlled by each reading of skip-control items of functional information read by one of said reading means for halting the operation thereof and initiating a cycle of operation of the other of said reading means while concurrently effectively rendering unavailable for utilization information read during said cycle by said other reading means, and means actuated by said other reading means during each cycle of operation thereof for automatically initiating resumed cyclic operation of said one reading means.

5. A data translation system comprising data utilizing means, first and second cyclically operating reading means operative one at a time to read individual ones of two record media to derive and supply to said utilizing means data and functional-control information recorded in said media, a switch means controlled by each reading of skip-control functional information read by one of said reading means for halting the operation thereof and initiating a cycle of operation of the other of said reading means while effectively preventing the utilization by said utilizing means and during said cycle of information read by said other reading means, and switch means actuated by said other reading means during each cycle of operation thereof for automatically initiating resumed operation of said one reading means.

6. A data translation system comprising cyclically operating data utilizing means, first and second cyclically operating reading means operative one at a time to read individual ones of two record media to derive and supply to said utilizing means data and functional-control information recorded in said media, a switch means controlled by each reading of skip-control functional information read by one of said reading means for halting the operation of said one reading means and effectively halting for one cycle the operation of said utilizing means and for initiating a cycle of operation of the other of said reading means, and means actuated by said other reading means during each cycle of operation thereof for automatically initiating resumed operation of said one reading means.

7. A data translation system comprising data utilizing means, first and second cyclically operating reading means operative one at a time to read individual ones of two record media to derive and supply to said utilizing means data and functional-control information recorded in said media, a switch means controlled by each reading of skip-control functional information read by one of said reading means for halting the operation thereof and initiating a cycle of operation of the other of said reading means while concurrently preventing utilization by said utilizing means of said skip-control information read by said one reading means and of information read during said cycle by said other reading means, and means actuated by said other reading means during each cycle of operation thereof for automatically initiating resumed operation of said one reading means.

8. A data translation system comprising data utilizing means, first and second cyclically operating reading means operative one at a time to read individual ones of two record media to derive and supply to said utilizing means data and functional-control information code recorded in said media, a switch means controlled by each reading of skip-control functional information read by one of said reading means for halting the operation thereof and initiating a cycle of operation of the other of said reading means while concurrently causing the generation and supply to said utilizing means of a spurious code effective to prevent the utilization thereby of information read during said cycle by said other reading means, and means actuated by said other reading means during each cycle of operation thereof for automatically initiating resumed operation of said one reading means.

9. A data translation system comprising first and second cyclically operating reading means for reading individual ones of two record media to derive and make available for utilization data and functional-control information recorded in said media, one of said reading means having a partial-revolution drive clutch for halting said one reading means at its code non-reading 0° cyclic position and at a code reading intermediate cyclic position, reader control means for placing said one reading means in operation by providing repetitive cyclic energizations of said clutch at said 0° cyclic position thereof and for thereafter maintaining said one reading means in operation by providing repetitive cyclic energizations of said clutch at said intermediate cyclic position thereof, and a switch means controlled by each reading of read-control information read by said one reading means for controlling said reader control means to transfer said energization of said clutch at said intermediate cyclic position from said reader control means to cyclic control by the other of said reading means and for concurrently initiating a cycle of reading operation of said other reading means.

10. A data translation system comprising data utilizing means, first and second cyclically operating means for reading individual ones of two recording media to derive and supply to said utilizing means data and functional-control information recorded in said media, one of said reading means having a partial-revolution drive clutch for halting said one reading means at its code non-reading 0° cyclic position and at its code reading approximate-half-revolution cyclic position thereof, reader control means for placing said one reading means in operation by providing repetitive cyclic energization of said clutch at the 0° cyclic position thereof and for utilizing energizations from said utilizing means to maintain said one reader means in operation by repetitive cyclic energizations of said clutch at said partial-revolution cyclic position thereof, and a switch means controlled by each reading of read-control information read by said one reading means for controlling said reader control means to effect transfer of said energization of said clutch at said partial-revolution position from said utilizing means to cyclic control by the other of said reading means and for concurrently initiating a cycle of reading operation by said other reading means.

11. A data translation system comprising data utilizing means, first and second cyclically operating reading means operative one at a time to read individual ones of two record media to derive and make available for utilization by said utilizing means data and functional-control information recorded in said media, manual means for initiating operation of one of said reading means and for concurrently initiating the conditioning of the other of said reading means for operation, a switch means controlled by each reading of read-control functional information read by said one reading means for halting the operation thereof and for concurrently completing the conditioning of said other reading means to effect a cycle of operation thereof, and means actuated by said other reading means during each cycle of operation thereof for automatically initiating resumed operation of said one reading means.

12. A data translation system comprising data utilizing means, first and second cyclically operating reading means operative one at a time to read individual ones of two record media to derive and make available for utilization by said utilizing means data and functional-control information recorded in said media, manual means for initiating operation of one of said reading means and for concurrently initiating the conditioning of the other of said reading means for operation, a switch means controlled by each reading of read-control functional information read by said one reading means for halting the operation thereof and for concurrently completing the conditioning of said other reading means to effect a cycle of operation thereof, means actuated by said other reading means during each cycle of operation thereof for automatically initiating resumed operation of said one reading means, and means for terminating operation of said one reading means manually and in response to a stop code read thereby.

13. A data translation system comprising data utilizing means, first and second reading means operative one at a time to read individual ones of two record media to derive and make available for utilization by said utilizing means data and functional-control information recorded in said media, switch control means selectably operable to two states in one of which read-control information read by either of said reading means transfers reading operation to the other thereof and in the other of which states read-control information read by one of said reading means temporarily interrupts for a preselected interval the operation of said one reading means and transfers reading operation for said interval to the other of said reading means, and switch means responsive to said other state of said control means and actuated by the operation of said other reading means for automatically initiating resumed operation of said one reading means at the conclusion of each said preselected interval.

14. A data translation system comprising data utilizing means, first and second reading means operative one at a time to read individual ones of two record media to derive and make available for utilization by said utilizing means and functional-control information recorded in said media, switch control means selectably operable to two states in the first of which read-control information read by either of said reading means transfers reading operation to the other thereof and in the second of which states read-control information read by a preselected one of said reading means temporarily interrupts for a preselected interval the operation of said preselected one reading means and transfers the reading operation for said interval to the other of said reading means, manually actuable means responsive to said first state of said control means for initiating operation of the one of said reading means last operated but responsive to said second state of said control means for initiating operation of said preselected one of said reading means regardless of which thereof was last operated, and switch means responsive to said second state of said control means and to the operative state of said other reading means for automatically initiating resumed operation of said preselected reading means at the conclusion of each said preselected interval.

15. A data translation system comprising first and second reading means for reading individual ones of two record media to derive and make available for utilization data and functional-control information recorded in said media, switch control means selectably operable to two states in the first of which read-control information read by either of said reading means transfers reading operation to the other thereof and in the second of which states read-control information read by a preselected one of said reading means temporarily interrupts for a preselected interval the operation of said preselected one reading means and transfers the reading operation for said interval to the other of said reading means, and switch means responsive to said first state of said control means and controlled by an automatic search request read by said other reading means for causing said one reading means to perform an automatic search to locate in the record medium read thereby data having an address supplied by said other reading means and responsive to said second state of said control means and controlled by an automatic search request read by said one reading means for causing said automatic search of the record medium read by said one reading means to locate data having an address supplied by said other reading means.

16. A data translation system comprising first and second reading means for reading individual ones of two record media to derive and make available for utilization data and functional-control information recorded in said media, switch control means selectably operable to two states in the first of which read-control information read by either of said reading means transfers reading operation to the other thereof and in the second of which states read-control information read by a preselected one of said reading means temporarily interrupts for a preselected interval the operation of said preselected one reading means and transfers the reading operation for said interval to the other of said reading means, and switch means responsive to said first state of said control means and controlled by an automatic search request read by said other reading means for causing said one reading means to perform an automatic search to locate in the record medium read thereby data having an address manually supplied and responsive to said second state of said control means and controlled by an automatic search request read by said one reading means for causing said automatic search by said one reading means to locate data having an address manually supplied.

17. A data translation system comprising first and second reading means for reading individual ones of two record media to derive and make available for utilization data and functional-control information recorded in said media, switch control means selectably operable to two states in the first of which read-control information read by either of said reading means transfers reading operation to the other thereof and in the second of which states read-control information read by a preselected one of said reading means temporarily interrupts for a preselected interval the operation of said preselected one reading means and transfers the reading operation for said interval to the other of said reading means, address storage means, a plurality of manually actuable means corresponding in number to a preselected maximum number of address digits and each having two operative states in one of which an address digit is manually stored in said address storage means and in the other of which states an address digit is supplied from said other reading means for storage in said storage means, and switch means responsive to said first state of said control means and controlled by an automatic search request read by said other reading means for causing said one reading means to perform an automatic search to locate in the record medium read thereby data having the address stored in said address storage means and responsive to said second state of said control means and controlled by an automatic search request read by said one reading means for causing said automatic search by said one reading means to locate data having the address stored in said address storage means.

18. A data translation system comprising a data printer, first and second reading means for reading individual ones of two record media to derive and supply to said printer data and functional-control information recorded in said media, switch control means selectably operable to two states in the first of which read-control information read by either of said reading means transfers reading operation to the other thereof and in the second of which states read-control information read by a preselected one of said reading means temporarily interrupts for a preselected interval the operation of said preselected one reading means and transfers the reading operation for said interval to the other of said reading means, switch means responsive to said first state of said control means and controlled by non-print information read by either of said reading means for terminating data printing by said printer until print-restore information is read by one of said reading means but responsive to said second state of said control means for terminating data printing by said printing means only between the reading of non-print and print-restore information read by said preselected one of said reading means, and means responsive to said second state of said control means and to the operative state of said other reading means for automatically initiating resumed operation of said preselected reading means at the conclusion of each said preselected interval.

19. A data translation system comprising data utilizing means having a preselected rate of cyclic operation, first and second reading means for reading individual ones of two record media to derive and supply to said utilizing means under control of said cyclic rate of operation thereof data and functional-control information recorded in said media, control means selectably operable to two states in the first of which read-control information read by either of said reading means transfers reading operation to the other thereof and in the second of which states read-control information read by a preselected one of said reading means temporarily interrupts for a preselected interval the operation of said preselected one reading means and transfers the reading operation for said interval to the other of said reading means, address storage means for receiving and storing a data address, and switch means responsive to said first state of said control means and controlled by an automatic search request read by said other reading means for causing said one reading means to perform an automatic search at a search reading rate substantially higher than said preselected rate to locate in the record medium read thereby data having the address stored in said address storage means and responsive to said second state of said control means and controlled by an automatic search request read by said one reading means for causing said automatic search thereby at said search reading rate to locate data having the address stored in said address storage means.

20. A data translation system comprising data utilizing means, first and second reading means for reading individual ones of two record media to derive and supply to said utilizing means data and functional-control information recorded in said media, address storage means, switch means controlled by a search request read by one of said reading means for conditioning said address storage means to store the address of data to be located by the search, a switch means controlled by each reading of a read-control information item read by said one reading means for transferring reading operation to said other reading means to receive and store in said address storage means said data address, and means responsive to the address reading operation of said other reading means for terminating the operation thereof and for initiating a search operation by said one reading means to locate in the record medium read thereby data having the address stored in said storage means.

21. A data translation system comprising data utilizing means, first and second reading means for reading individual ones of two record media to derive and supply to said utilizing means data and functional-control information recorded in said media, address storage means, means responsive to a search request read by one of said reading means for conditioning said address storage means to store the address of data to be located by the search and responsive to an address portion thereafter read by said one reading means for storing said address portion in said address storage means, a switch means controlled by each reading of a read-control information item read by said one reading means for transferring reading operation to said other reading means to receive and store in said address storage means the remainder of said data address, and means actuated by the address reading operation of said other reading means for terminating the operation thereof and for initiating said search operation by said one reading means to locate in the record medium read thereby data having the address stored in said storage means.

22. A data translation system comprising data utilizing means, first and second reading means for reading individual ones of two record media to derive and supply to said utilizing means data and functional-control information recorded in said media, means for storing item and class portions of a data address and including address control means controlled by a preselected address storage state to have two operative states of which one retains said class-address portion in said storage means and the other state clears said class-address portion from storage therein, means responsive to a search request read by one of said reading means for conditioning said address storage means by clearing at least the item address portion previously stored therein in readiness to store a new data address, a switch means controlled by each reading of a read-control information item read by said one reading means for transferring reading operation to said other reading means to receive and store in said address storage means at least an item portion of said new data address, and means actuated by the address reading operation of said other reading means for terminating the operation thereof and for initiating said search operation by said one reading means to locate in the record medium read thereby data having the address stored in said storage means.

23. A data translation system comprising data utilizing means, first and second reading means for reading individual ones of two record media to derive and supply to said utilizing means data and functional-control information recorded in said media, means for storing item and class portions of a data address and including address control means having two operative states of which one is established by the storage of less than a full address in said storage means and is effective to retain said class-address portion in said storage means and the other state is established by the storage of a full address in said storage means and is effective to clear said class-address portion from storage therein, means responsive to a search request read by one of said reading means for conditioning said address storage means by clearing at least the item address portion previously stored therein in readiness to store a new data address, a switch means controlled by each reading of a read-control information item read by said one reading means for transferring reading operation to said other reading means to receive and store in said address storage means at least an item portion of said new data address, and means actuated by the address reading operation of said other reading means for terminating the operation thereof and for initiating said search operation by said one reading means to locate in the record medium read thereby data having the address stored in said storage means.

24. A data translation system comprising data utilizing means, first and second reading means for reading individual ones of two record media to derive and supply to said utilizing means data and functional-control information recorded in said media, means for storing item and classss portions of a data address and including address control means having two operative states of which one retains said class-address portion in said storage means and the other state clears said class-address portion from storage therein, means responsive to successive search requests read by one of said reading means for conditioning said address storage means by operation of said address control means to said other state thereof to clear the item and class address portions previously stored therein in readiness to store a new data address, a switch means controlled by each reading of a read-control information item read by said one reading means for transferring reading operation to said other reading means to receive therefrom and store in said address storage means said new data address, and means actuated by the address reading operation of said other reading means for terminating the operation thereof and for initiating said search operation by said one reading means to locate in the record medium read thereby data having the address stored in said storage means.

25. A data translation system comprising a data printer, first and second cyclically operating reading means for reading individual ones of two record media to derive during each reading cycle thereof and supply to said data printer an item of data and functional-control information recorded in said media, means responsive to each occurrence of a read-control functional information item read by one of said reading means for halting the operation thereof and initiating a cycle of operation by the other of said reading means, means controlled by said other reading means during each cycle of operation thereof for automatically initiating resumed cyclical operation of said one reading means, and means responsive to a non-print information item read by said one reading means for terminating data printing by said printer until a print-restore item of information is read by said one reading means.

26. A data translation system comprising a data printer, first and second cyclically operating reading means for reading individual ones of two record media to derive during each reading cycle thereof and supply to said data printer an item of data and functional-control information recorded in said media, read-control means responsive to each occurrence of a read-control functional information item read by one of said reading means for halting the operation thereof and initiating a cycle of operation by the other of said reading means, means controlled by said other reading means during each cycle of operation thereof for automatically initiating resumed cyclical operation of said one reading means, means for manually terminating data printing by said printer until said one reading means is halted, and means controlled by said last-mentioned means for terminating during each said termination of data printing the response of said read-control means to said read-control functional information item.

27. A data translation system comprising utilizing means, first and second cyclically operating reading means for reading individual ones of two record media to derive during each reading cycle thereof and supply to said utilizing means an item of data and functional-control information recorded in said media; read-control means responsive to each occurrence of a read-control functional information item read by one of said reading means for halting the operation thereof and initiating a cycle of operation by the other of said reading means, means controlled by said other reading means during each cycle of operation thereof for automatically initiating resumed cyclical operation of said one reading means, means for manually initiating a skip operation by terminating the supply of said derived information to said utilizing means while concurrently terminating the response of said read-control means to said read-control functional item of information, and means responsive to a skip restore item of information read by said one reading means for terminating each skip operation.

References Cited by the Examiner
UNITED STATES PATENTS 2,885,659   5/1959   Spielberg _ _ _ _ _ _ _ _ _ _ _   340—174

MALCOLM A. MORRISON, *Primary Examiner.*

EVERETT R. REYNOLDS, IRVING L. SRAGOW,
*Examiners.*